(12) United States Patent
Kaneda

(10) Patent No.: US 9,524,062 B2
(45) Date of Patent: Dec. 20, 2016

(54) PROJECTION DISPLAY

(71) Applicant: SONY CORPORATION, Tokyo (JP)

(72) Inventor: Kazumasa Kaneda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/909,907

(22) PCT Filed: Aug. 18, 2014

(86) PCT No.: PCT/JP2014/004210
§ 371 (c)(1),
(2) Date: Feb. 3, 2016

(87) PCT Pub. No.: WO2015/029365
PCT Pub. Date: Mar. 5, 2015

(65) Prior Publication Data
US 2016/0196005 A1 Jul. 7, 2016

(30) Foreign Application Priority Data

Aug. 26, 2013 (JP) ................................. 2013-174728
Feb. 24, 2014 (JP) ................................. 2014-032742

(51) Int. Cl.
*H04N 9/31* (2006.01)
*G06F 3/042* (2006.01)
(Continued)

(52) U.S. Cl.
CPC ........... *G06F 3/0425* (2013.01); *G02B 5/3058* (2013.01); *G02B 13/0095* (2013.01);
(Continued)

(58) Field of Classification Search
CPC .. H04N 9/3197; H04N 9/3167; H04N 9/3194; H04N 9/3141; H04N 9/31; G02B 5/3058; G02B 13/0095; G02B 27/283; G03B 11/00; G03B 17/54; G03B 21/006; G03B 21/28; G06F 3/0425
(Continued)

(56) References Cited

U.S. PATENT DOCUMENTS 5,331,149 A * 7/1994 Spitzer ................. H04N 9/3141
345/7
6,140,980 A * 10/2000 Spitzer ................. H04N 9/3141
345/8
(Continued)

FOREIGN PATENT DOCUMENTS

| JP | 2003-044839 A | 2/2003 |
| JP | 2007-052218 A | 3/2007 |
| JP | 2013-003859 A | 1/2013 |

*Primary Examiner* — Sherrie Hsia
(74) *Attorney, Agent, or Firm* — Chip Law Group

(57) ABSTRACT

An optical module includes a polarized-light separation device configured to separate first and second polarized components of incident light, a light valve configured to receive at least the first polarized component, and output at least a portion of the received light to the polarized-light separation device. The optical module further includes an imaging device disposed at a position that is at least substantially optically conjugated with the light valve, and as optical member positioned and configured to remove at least a portion of the second polarized component of the incident light before reaching the image pickup device.

23 Claims, 24 Drawing Sheets

(51) Int. Cl.
*G03B 11/00* (2006.01)
*G03B 17/54* (2006.01)
*G03B 21/00* (2006.01)
*G03B 21/28* (2006.01)
*G02B 5/30* (2006.01)
*G02B 13/00* (2006.01)
*G02B 27/28* (2006.01)

(52) U.S. Cl.
CPC ............ *G02B 27/283* (2013.01); *G03B 11/00* (2013.01); *G03B 17/54* (2013.01); *G03B 21/006* (2013.01); *G03B 21/28* (2013.01); *H04N 9/3141* (2013.01); *H04N 9/3167* (2013.01); *H04N 9/3194* (2013.01); *H04N 9/3197* (2013.01)

(58) Field of Classification Search
USPC ............................................ 348/744; 353/20
IPC ........................................................ H04N 9/31
See application file for complete search history.

(56) References Cited

U.S. PATENT DOCUMENTS

| | | |
|---|---|---|
| 2008/0051135 A1 | 2/2008 | Destain et al. |
| 2010/0296060 A1 | 11/2010 | Huang |
| 2012/0256879 A1 | 10/2012 | Liu et al. |
| 2012/0280941 A1 | 11/2012 | Hu |

\* cited by examiner

PROJECTION DISPLAY

CROSS REFERENCE TO RELATED APPLICATIONS

This application claims the benefit of Japanese Priority Patent Application JP2013-174728 filed Aug. 26, 2013, and Japanese Priority Patent Application JP2014-32742 filed Feb. 24, 2014, the entire contents of each of which are incorporated herein by reference.

TECHNICAL FIELD

The present disclosure relates to a projection display having an image pickup function.

BACKGROUND ART

In recent years, in units such as smartphones and tablet terminals, page turning and scaling of images displayed on a screen, which are performed in response to pointing operation through intuition of a person, have been enabled by use of a touch panel. Meanwhile, displays that display an image by projecting the image on a screen have been known as projectors for a long time.

CITATION LIST

Patent Literature

[PTL 1]
JP 2013-3859A
[PTL 2]
JP 2007-52218A
[PTL 3]
JP 2003-44839A

SUMMARY

Technical Problem

In recent years, like tablet terminals etc., projectors have also been expected to accept pointing operation of a projected image, in a manner similar to operation on a touch panel by a hand through intuition of a person. In particular, hand-held-type small projectors, which have appeared on the market in recent years, have been expected to accept pointing operation of an image projected in a projection area of about 20 inches to 30 inches. However, in this type of projector, a touch panel is not incorporated in a screen, a wall, or the like where an image is projected and therefore, it is necessary to detect operation by a hand, through use of other means. Besides this approach, in some projectors, an image is allowed to be moved by operating a wireless remote controller or the like. However, small projectors themselves are small in size and therefore, operation through a wireless remote controller or the like is not smart.

PTL 1 has proposed a unit that enables pointing operation of an image in a form of covering a projection area, by combining a projection unit with a detection unit that detects operation (a gesture) performed by a hand. However, in the unit proposed by PTL 1, a projection section and a detection section are separate and therefore, the size of the entire system tends to be large. In addition, besides becoming large in size, there is such a drawback, concerning a configuration etc. of relative position coordinates between a projection area and a detection area, that it is necessary to perform calibration operation with accuracy. The accuracy of this calibration is important because this accuracy directly affects accuracy of the pointing operation and therefore, it is necessary to perform the calibration for all parts of a screen, which is complicated.

PTL 2 and PTL 3 have each proposed a unit in which an image pickup function is added to a projector. In the unit proposed by PTL 3, a light flux from a light source such as an extra-high pressure mercury lamp is incident on a polarization conversion device in which the light flux is converted into a specific polarized component, and this polarized component is guided to a light valve. However, in this type of polarization conversion device, a component not being converted into the specific polarized component is incident on an image pickup device without traveling to the light valve, so that illumination light for projection adversely affects image pickup. A polarization conversion device dedicated to image pickup may be added to avoid this situation. However, this increases the size of a projection lens and therefore is not practical. In contrast, in the unit proposed by PTL 2, adverse effects of illumination light are prevented, by turning off illumination light for projection when image pickup is performed, without adding a polarization conversion device dedicated to image pickup. However, since the illumination light is turned off in the image pickup, if is difficult to secure sufficient brightness necessary for the image pickup, for example, when the unit is used in a dark external environment. Therefore, there are constraints in use, as a unit frequently used in a dark external environment like a projector.

It is desirable to provide a projection display capable of easily achieving detection of an object on or in proximity to a projection plane with high accuracy.

Solution to Problem

In an embodiment, an optical module includes a polarized-light separation device configured to separate first and second polarized components of incident light, a light valve configured to receive at least the first polarized component, and output at least a portion of the received light to the polarized light separation device. The optical module further includes an imaging device disposed at a position that is at least substantially optically conjugated with the light valve, and an optical member positioned and configured to remove at least a portion of the second polarized component of the incident light before reaching the image pickup device.

In another embodiment, an optical system includes: an optical module including a polarized-light separation device configured to separate first and second polarized components of incident light; a light valve configured to receive at least the first polarized component, and output at least a portion of the received light to the polarized-light separation device; an imaging device disposed at a position that is at least substantially optically conjugated with the light valve; and an optical member positioned and configured to remove at least a portion of the second polarized component of the incident light before reaching the image pickup device; and an image processing section configured to process image data received by the image pickup device.

In another embodiment, a detection method includes: separating first and second polarized components of incident light with a polarized-light separation device; receiving with a light valve at least the first polarized component, and outputting at least a portion of the received light to the polarized-light separation device; projecting an image, based on at least a portion of the modulated light, in a projection path toward a projection area; receiving with an imaging device at least portions of detection light that is incident from the projection area after the detection light interacts with the polarized-light separation device; and detecting, based on image processing by the image device, a position of the object that is positioned in the projection path, wherein at least a portion of the second polarized component of the incident light is removed by an optical member before reaching the image pickup device.

In another embodiment, an optical module includes a polarized-light separation device configured to separate first and second polarized components of incident light, a light valve configured to receive at least the first polarized component, and output at least a portion of the received light to the polarized-light separation device, an imaging device disposed at a position that is at least substantially optically conjugated with the light valve, and an optical member positioned in front of the polarized-light separation device.

Advantageous Effects of Invention

According to the projection display of the above-described embodiment of the present disclosure, the image pickup device is disposed at the position optically conjugated with the light valve, and the polarized component unnecessary for object detection is reduced by disposing the optical member at an appropriate position. Therefore, object detection with high accuracy is readily achievable. It is to be noted that, effects are not limited to that described here, and may be any of effects described in the present disclosure.

It is to be understood that both the foregoing general description and the following detailed description are exemplary, and are provided to provide further explanation of the technology as claimed.

DESCRIPTION OF EMBODIMENTS

Some embodiments of the present disclosure will be described in detail with reference to the drawings. It is to be noted that the description will be provided in the following order.

Figure 1:
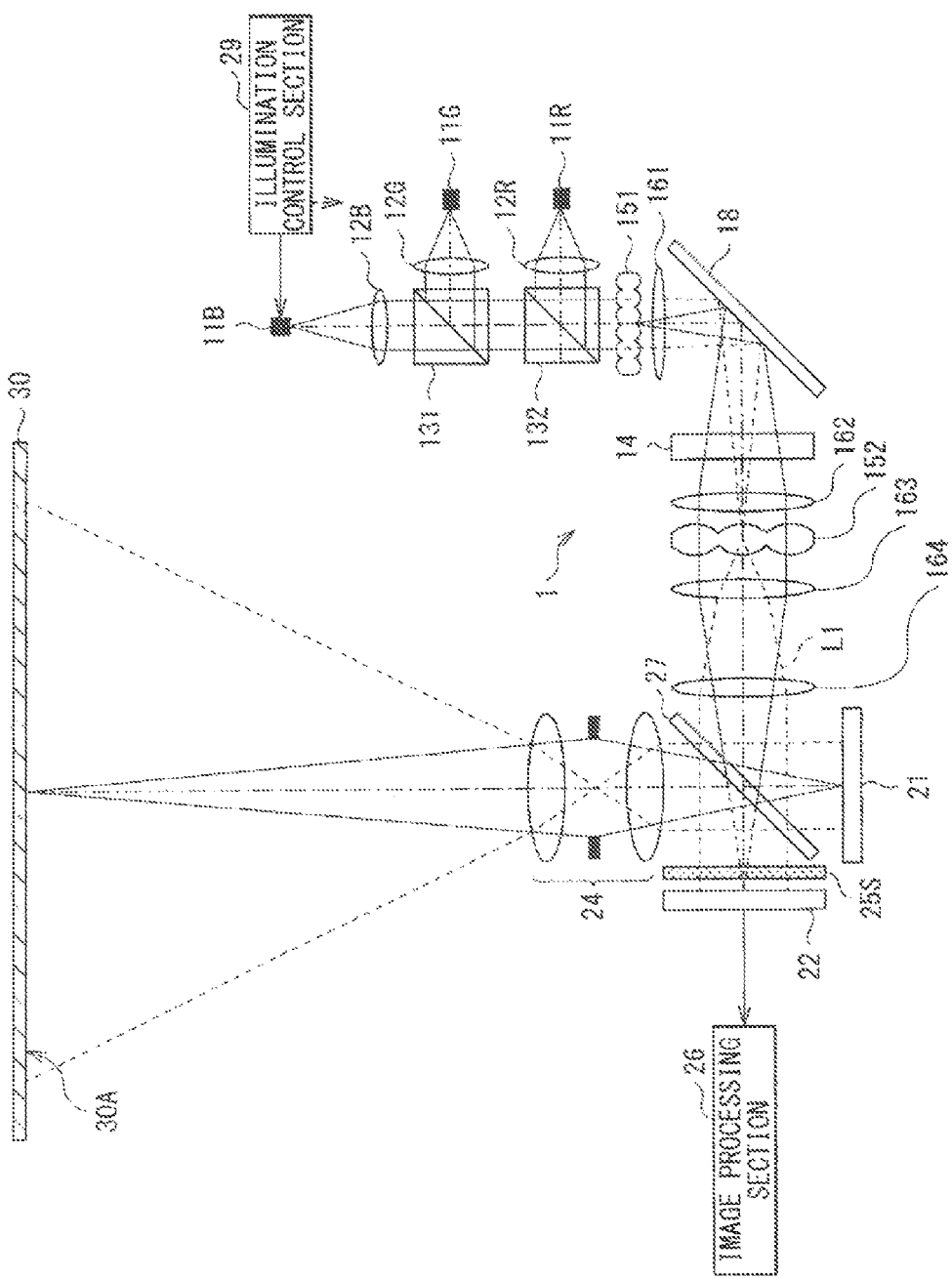
FIG. 1 is a configuration diagram illustrating an example of an overall configuration of a projection display according to a first embodiment of the present disclosure.
Figure 2:
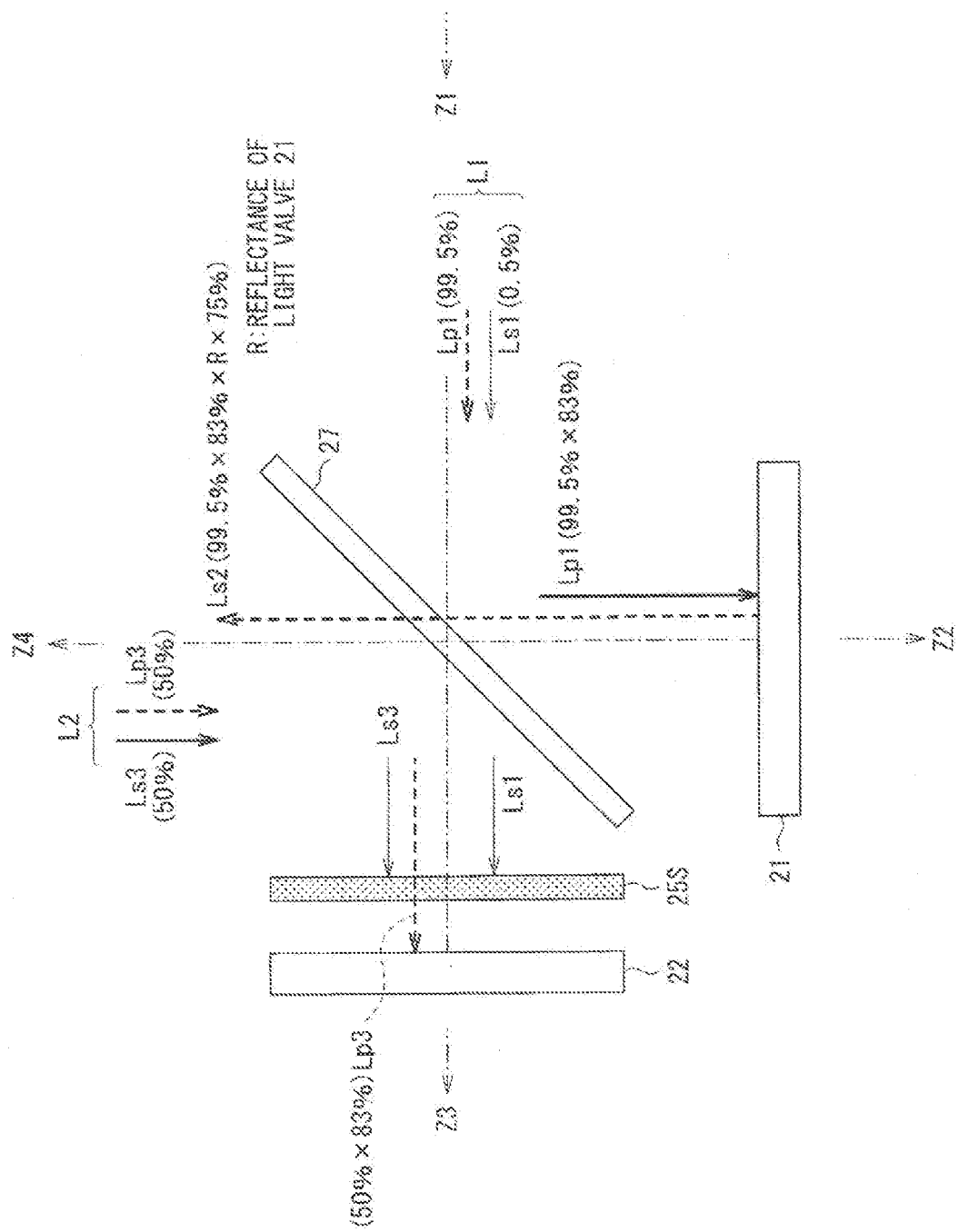
FIG. 2 is a cross-sectional diagram illustrating a main part configuration of the projection display according to the first embodiment, together with a state and a proportion of light incident on each of a light valve and an image pickup device.
Figure 3:
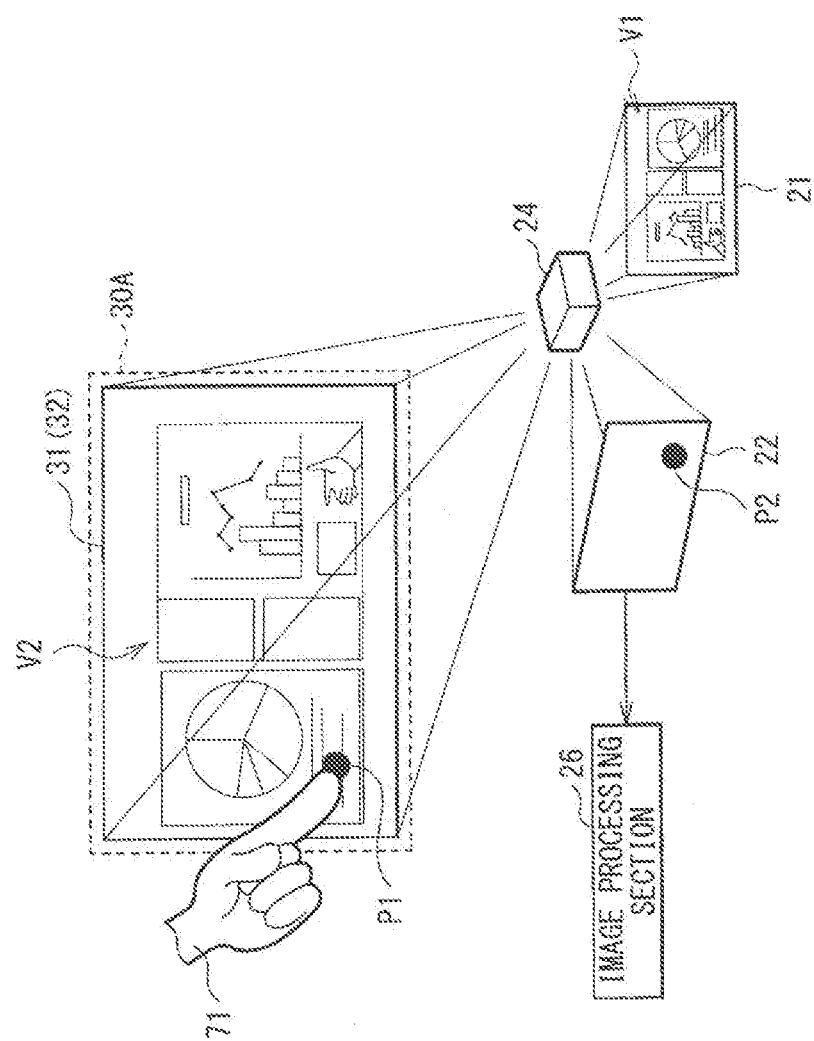
FIG. 3 is an explanatory diagram schematically illustrating a concept of image display and object detection.

1. First embodiment (a projection display having a passive detection function)
    1.1 Configuration
    1.2 Operation
    1.3 Effects
    1.4 Modifications of the first embodiment
        1.4.1 First modification
        1.4.2 Second modification
        1.4.3 Third modification
        1.4.4 Fourth modification
2. Second embodiment (a projection display having an active detection function)
    2.1 Configuration and functions
    2.2 Modifications of the second embodiment
    2.2.1 First modification
    2.2.2 Second modification
3. Third embodiment (a projection display having a relay optical system on an image pickup side)
    3.1 First configuration example
    3.2 Second configuration example
    3.3 Third configuration example
4. Fourth embodiment (a projection display having a bandpass filter)
    4.1 Basic configuration example
    4.2 Configuration example suitable for use of bandpass filter
    4.3 Other preferable configuration examples
5. Other embodiments 1. First Embodiment 1.1 Configuration FIG. 1 illustrates an example of an overall configuration of a projection display (a projector) according to a first embodiment of the present disclosure. FIG. 2 illustrates a main part configuration in the projection display illustrated in FIG. 1, together with a state and a proportion of light incident on each of a light valve 21 and an image pickup device 22. This projection display has a function of performing image display, and also a function of performing passive object detection. FIG. 3 schematically illustrates a concept of the image display and the object detection performed by this projection display.

As illustrated in FIG. 1, this projection display includes an illumination section 1, the light valve 21, the image pickup device 22, a wire grid 27, a projection lens 24, a polarizer 25S, an image processing section 26, and an the illumination control section 29. The wire grid 27 serves as a polarized-light separation device, and the polarizer 25S serves as a polarizing member.

The illumination section 1 emits illumination light L1 in a first direction Z1 towards the wire guide 27, as illustrated in FIG. 2. The illumination section 1 includes a blue laser 11B, a green laser 11G, a red laser 11R, a first coupling lens 12B, a second coupling lens 12G, and a third coupling lens 12R. The illumination section 1 further includes a drive optical device 14, a mirror 52, a first fly-eye lens 151, a second fly-eye lens 152, a first condensing lens 161, a second condensing lens 162, a third condensing lens 163, and a fourth condensing lens 164.

The blue laser 11B is a laser light source emitting a blue laser beam. The green laser 11G is a laser light source emitting a green laser beam. The red laser 11R is a laser light source emitting a red laser beam.

The illumination control section 29 controls light emission of each of a first light source (for example, the blue laser 11B), a second light source (for example, the green laser 11G), and a third light source (for example, the red laser 11R). For example, the illumination control section 29 may control the light emission of each of the first to the third light sources, in a field sequential scheme.

The second coupling lens 12G is a lens used to collimate (provide parallel light of) the green laser beam emitted from the green laser 11G, and to couple the collimated beam to a first dichroic prism 131. Similarly, the first coupling lens 12B is a lens used to collimate the blue laser beam emitted from the blue laser 11B, and to couple the collimated beam to the first dichroic prism 131. Further, the third coupling lens 12R is a lens used to collimate the red laser beam emitted from the red laser 11R, and to couple the collimated beam to a second dichroic prism 132. It is to be noted that the respective incident laser beams may be preferably collimated by the coupling lenses 12R, 12G, and 12B (to be provided as parallel light).

The first dichroic prism 131 is a prism that selectively reflects the green laser beam incident through the second coupling lens 12G, while selectively allowing the blue laser beam incident through the first coupling lens 12B to pass therethrough. The second dichroic prism 132 is a prism that selectively reflects the red laser beam incident through the third coupling lens 12R, while selectively allowing the blue laser beam and the green laser beam emitted from the first dichroic prism 131 to pass therethrough. Therefore, color composition (optical-path synthesis) for the red laser beam, the green laser beam, and the blue laser beam is performed.

The drive optical device 14 is an optical device used to reduce speckle noise and interference fringes in the illumination light L1, and disposed on an optical path between the first condensing lens 161 and the second condensing tens 162. The drive optical device 14 may be capable of reducing the speckle noise and the interference fringes in the illumination light L1, by, for example, changing a state of a passing light flux, by having micro vibration in a direction along the optical path or a direction orthogonal to the optical axis.

The first fly-eye lens 151 and the second fly-eye lens 152 are each an optical member (an integrator) with a plurality of lenses two-dimensionally disposed on a substrate, and spatially divides the incident light flux according to an array of the plurality of lenses, to emit the divided light flux. The first fly-eye lens 151 is disposed on an optical path between the second dichroic prism 132 and the first condensing lens 161. The second fly-eye lens 152 is disposed on an optical path between the second condensing lens 162 and the third condensing lens 163. In-plane light quantity distribution of the illumination light L1 is equalized by the first fly-eye lens 151 and the second fly-eye lens 152.

The mirror 52 is disposed on an optical path between the first condensing lens 161 and the drive optical device 14. The first condensing lens 161 is a lens that condenses an outgoing beam from the first fly-eye lens 151, so that the condensed bean is incident on the drive optical device 14 through the mirror 52. The second condensing lens 162 is a lens that condenses an outgoing beam from the drive optical device 14, so that the condensed beam is incident on the second fly-eye lens 152.

The third condensing lens 163 and the fourth condensing lens 164 are each a lens that condenses an outgoing beam from the second fly-eye lens 152, so that the condensed beam is emitted as the illumination light L1 towards the wire grid 27.

The wire grid 27 may be a grid provided by, for example, forming a metal grid with narrow spacing on a glass substrate. On the wire grid 27, the illumination light L1 from the first direction Z1 is to be incident. The light valve 21 is disposed in a second direction Z2. The polarizer 25S and the image pickup device 22 are disposed in a third direction Z3. The projection lens 24 is disposed in a fourth direction Z4.

The wire grid 27 is a polarized-light separation device that separates the incident light into a first polarized component (for example, a P-polarized component) and a second polarized component (for example, an S-polarized component), and allows the polarized components to travel in respective directions different from each other. The wire grid 27 selectively reflects a specific first polarized component, and selectively allows a specific second polarized component to pass therethrough. For example, as illustrated in FIG. 2, the wire grid 27 may emit (reflect) much of a P-polarized component Lp1 in the second direction Z2, and also emit (allow passage of) much of an S-polarized component Ls1 is the third direction Z3. The P-polarized component Lp1 and the S-polarized component Ls1 are included in the illumination light L1 incident from the first direction Z1. Further, as illustrated is FIG. 2, the wire grid 27 may emit (reflect) much of a P-polarized component Lp3 in the third direction Z3. The P-polarized component Lp3 is included in detection light L2 incident from a direction opposite to the fourth direction Z4.

The light valve 21 may be, for example, a reflection-type liquid crystal device such as Liquid Crystal On Silicon (LCOS). For example, as illustrated in FIG. 2, the light valve 21 may modulate, based on image data, the first polarized component (for example, the P-polarized component Lp1) included in the illumination light L1 and incident from the second direction Z2 through the wire grid 27. Further, the light valve 21 emits this modulated light to the fourth direction Z4 through the wire grid 27. From the light valve 21, for example, an S-polarized component Ls2 whose state of polarization is turned from a state of polarization at incident time may be emitted as the modulated light, as illustrated in FIG. 2. It is to be noted that, in the light valve 21, it is possible to perform black display by returning the incident P-polarized component Lp1 remaining in the same state of polarization, to the wire grid 27.

The projection lens 24 projects the modulated light emitted from the light valve 21 and incident from the fourth direction Z4 through the wire grid 27, on a projection plane 30A of a screen 30. Further, as illustrated in FIG. 2, the detection light L2 is incident on the projection lens 24, from a direction opposite to a traveling direction of the modulated light. The projection lens 24 is a projection optical system used to project an image, and also serves as an image-formation optical system for the object detection.

The image pickup device 22 is configured of a solid-state image pickup device such as a complementary metal-oxide semiconductor (CMOS) and a charge coupled device (CCD). The image pickup device 22 is disposed at a position optically conjugated with the light valve 21. To be more specific, when the light valve 21 is a reflection-type liquid crystal device, a display surface (a liquid crystal surface) on which an image is to be created, and an image pickup surface of the image pickup device 22, are disposed at positions optically conjugated with each other. As illustrated in FIG. 2, the detection light L2 from the third direction Z3 is incident on the image pickup device 22, through the projection lens 24 and the wire grid 27.

The polarizer 25S is a polarizing member that is one of optical members that reduce the second polarized component included in the illumination light L1. The polarizer 25S is disposed between the image pickup device 22 and the wire grid 27. The polarizer 25S removes the second polarized component (for example, the S-polarized component) included in the incident light. As illustrated in FIG. 2, the polarizer 25S removes, as the second polarized component, at least the S-polarized component Ls1 included in the illumination light L1 and incident through the wire grid 27.

As illustrated in FIG. 3, the image processing section 26 may detect, based on a result of image picked up by the image pickup device 22, for example, a position P1 of a feature point of an indicator (an object) 71 such as a finger of a person and a pointer, in a fashion of associating the position P1 with coordinates in a projected image V2 on the projection plane 30A. A position of a fingertip of a person is illustrated as an example of the feature point in FIG. 3, but the feature point is not limited to this example. The center of gravity of a finger of a person, the center of gravity of a hand, or the like may be appropriately selected.

1.2 Operation

In this projection display, as illustrated in FIGS. 1 and 3, image information V1 formed at the light valve 21 is projected on the projection plane 30A of the screen 30 by the projection lens 24, and displayed as the projected image V2 by being enlarged. Further, this projection display may detect by using the image pickup device 22, the position of an object on the projection plane 30A, for example, the position P1 of the feature point of the indicator (the object) 71 such as a finger of a person and a pointer. The image pickup device 22 picks up an image of an area substantially the same as a projection area 31 on the projection plane 30A, as an image-pickup area 32.

In this projection display, the polarized component of the illumination light L1 is allowed to be adjusted to become dominant, by using the laser light sources in the illumination section 1. Specifically, the first polarized component may be preferably 99% or more, and may be more preferably 99.5% or more. Here, as the first polarized component to be made dominant, either the S-polarized component Ls1 or the P-polarized component Lp1 may be selected to match with characteristics of the polarization conversion device. However, in either case, it is difficult to make the second polarized component become completely zero.

Here, an example of characteristics of the wire grid 27 is provided in Table 1. It is to be noted that Tp indicates transmittance of the P-polarized component, and Ts indicates transmittance of the S-polarized component. Rp indicates reflectance of the P-polarized component, and Rs indicates reflectance of the S-polarized component.

[Table 1]

When the first polarized component is the P-polarized component and the second polarized component is the S-polarized component, the wire grid 27 reflects much of the P-polarized component and allows much of the S-polarized component to pass therethrough, as provided in Table 1. Therefore, for example, as illustrated in FIG. 2, 99.5% of the illumination light L1 is provided as the P-polarized component Lp1 that is dominant, and the remaining 0.5% is provided as the S-polarized component Ls1. The wire grid 27 reflects much of the dominant P-polarized component Lp1, which is then emitted towards the light valve 21. The S-polarized component Ls1 incident on the light valve 21 is modulated (turned) by the light valve 21 to be the S-polarized component Ls2 as the modulated light. The S-polarized component Ls2 is then incident on the projection lens 24 through the wire grid 27. The S-polarized component Ls2, which is the modulated light, is projected as the projected image V2 on the projection plane 30A of the screen 30 through the projection less 24, as illustrated in FIG. 3.

In this projection display, the image pickup device 22 is disposed at the position optically conjugated with the light valve 21. In addition, the projection lens 24 serves as the projection optical system for projection of an image, and also serves as the image-formation optical system for the object detection. Therefore, as illustrated in FIG. 3, an image of the same area as the projection area 31 is allowed to be picked up as the image-pickup area 32, by the image pickup device 22. The light valve 21 and the image pickup device 22 are at the conjugate positions. Therefore, the position P1 of the feature point of the indicator 71 such as a finger of a person and a pointer on the projection plane 30A is allowed to be overlaid on the projected image V2 through the projection lens 24, and to be monitored. Further, for example, in the image processing section 26, pointing operation of the projected image V2 is allowed by performing image processing on the shape of the indicator 71, and detecting the coordinates of the position P1 of the feature point of the indicator 71. At this moment, an arbitrary coordinate position in the projection area 31 and a coordinate position in the image-pickup area 32 are in a one-to-one correspondence. Therefore, the coordinates of a detection position P2 on the image pickup device 22 side corresponds to the coordinates of the position P1 of the feature point of the indicator 71. It is to be noted that the indicator 71 may be provided as each of two or more indicators, so that, for example, it is possible to detect coordinates of a fingertip of each of both hands. By thus using the position of the feature point of the detected indicator 71, intuitive operation is allowed to be performed, as if a touch panel is incorporated in the projected image V2 of the projector.

Next, functions of the polarizer 25S will be described with reference to FIG. 2. The detection light L2 incident on the wire grid 27 is substantially natural light, and an S-polarized component Ls3 and the P-polarized component Lp3 are each included as a polarized component thereof by 50%. The wire grid 27 reflects much of the P-polarized component Lp3 in the third direction Z3. When the polarizer 25S is assumed to remove the S-polarized component, almost all the reflected P-polarized component Lp3 reaches the image pickup device 22. Further, of the illumination, light L1 incident on the wire grid 27, the S-polarized component Ls1 is emitted in the third direction Z3. The S-polarized component Ls1 becomes a noise component with respect to the detection light L2, and when the S-polarized component Ls1 is incident on the image pickup device 22, a signal to noise (S/N) ratio at the time of detection becomes small, which reduces detection accuracy. It is possible to enhance the detection accuracy, by increasing the S/N ratio, by disposing the polarizer 25S to remove the S-polarized component Ls1.

Here, a quantity of light incident on each of the light valve 21 and the image pickup device 22 when the wire grid 27 is used will be discussed. Assume that a small display is used as the projection display, and image display is performed at about 100 lm. An area where object detection is desired may be, for example, about 30 cd/m$^2$, in a situation where there is indoor lighting. Then, for example, illumination of light incident on the image pickup device 22 after passing through the projection lens 24 may be about a few lux. Meanwhile, basically, the illumination light L1 has the polarized light adjusted to the P-polarized component and therefore is reflected by the wire grid 27, and then travels to the light valve 21. However, although the light flux of the illumination light L1 also has the adjusted polarized component because the light flax is a laser beam, about 0.5% of a polarized component (the S-polarized component Ls1) not to be used is included.

Of the light of the S-polarized component Ls1, 15% passes through the wire grid 27, and has three-or-more-digit illumination, which is about 3000 lux, when reaching the image pickup device 22. Therefore, although information about illumination of a few lux is desired to be detected on the detection side, some thousands lux of unnecessary light exists on a light transmission side. Hence, it is difficult to read a change in luminance of only the desired information, and information about a change in position. It is possible to address such a disadvantage, by removing the S-polarized component Ls1 by providing the polarizer 25S.

1.3 Effects

As described above, according to the present embodiment, the image pickup device 22 is disposed at the position optically conjugated with the light valve 21, and the polarizer 25S is disposed as one of the optical members at an appropriate position, to remove the polarized component that becomes unnecessary at the time of the object detection. Therefore, it is possible to achieve object detection with high accuracy easily. It is to be noted that any effect described herein is a mere example and non-limiting, and the present technology may provide other effects. This also applies to other embodiments and modifications that will be described below.

1.4 Modifications of First Embodiment (1.4.1 First Modification)

Figure 4:
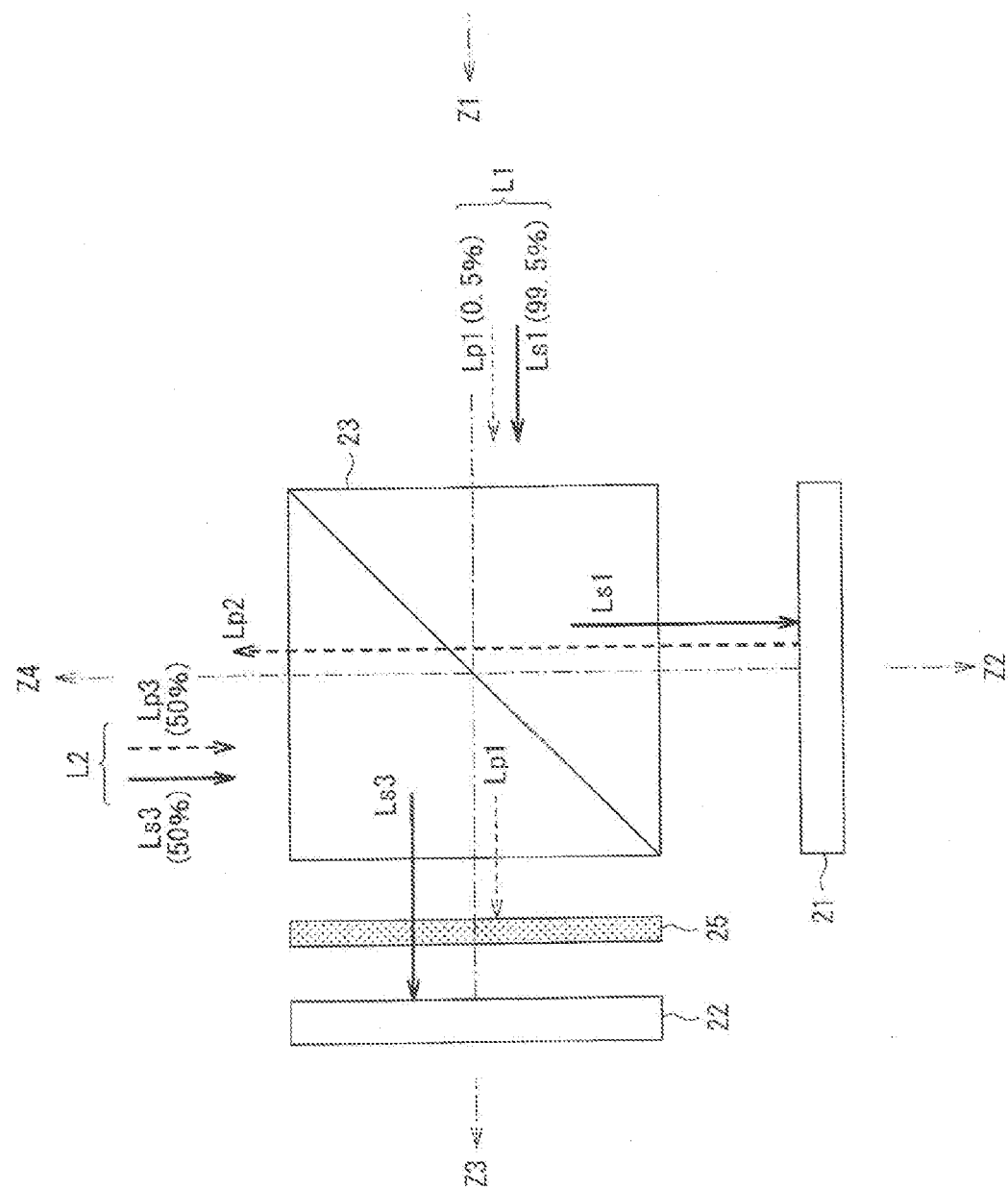
FIG. 4 is a cross-sectional diagram illustrating a main part configuration of a projection display according to a first modification of the first embodiment, together with a state of light incident on each of a light valve and an image pickup device.

FIG. 4 illustrates a main part configuration of a projection display according to a first modification of the first embodiment, together with a state of light incident on each of the light valve 21 and the image pickup device 22. In the first modification, a polarization beam splitter 23 is provided as the polarized-light separation device, in place of the wire grid 27. In addition, in the first modification, a polarizer 25 that removes the P-polarized component is provided in place of the polarizer 25S that removes the S-polarized component.

In the wire grid 27 in the configuration of FIG. 2, the first polarized component is the P-polarized component, the second polarized component is the S-polarized component, the wire grid 27 reflects the P-polarized component, and allows the S-polarized component to pass therethrough.

However, the polarization beam splitter 23 has a characteristic opposite to this characteristic.

The polarization beam splitter 23 has four optical surfaces. Here, two surfaces facing each other in a horizontal direction in FIG. 4 are provided as a first optical surface and a third optical surface. Further, two surfaces facing each other in a vertical direction in FIG. 4 are provided as a second optical surface and a fourth optical surface. As illustrated in FIG. 4, on the first optical surface of the polarization beam splitter 23, the illumination light L1 is incident from the first direction Z1. With respect to the second optical surface of the polarization beam splitter 23, the light value 21 is disposed in the second direction Z2. With respect to the third optical surface of the polarization beam splitter 23, the polarizer 25 and the image pickup device 22 are disposed in the third direction Z3. With respect to the fourth optical surface of the polarization beam splitter 23, the projection lens 24 is disposed in the fourth direction Z4.

The polarization beam splitter 23 is a polarized-light separation device that separates the incident light into a first polarized component (for example, the S-polarized component) and a second polarized component (for example, the P-polarized component), and allows these polarized components to travel in the respective directions different from each other. The polarization beam splitter 23 selectively reflects a specific first polarized component, and selectively allows a specific second polarized component to pass therethrough. For example, as illustrated in FIG. 4, the polarization beam splitter 23 may emit (reflect) almost all the S-polarized component Ls1 in the second direction Z2, and emit (allow passage of) almost all the P-polarized component Lp1 in the third direction Z3. The S-polarized component Ls1 and the P-polarized component Lp1 are included in the illumination light L1 incident from the tint direction Z1. Further, as illustrated in FIG. 4, the polarization beam spinier 23 may emit (reflect) almost all the S-polarized component Ls3 in the third direction Z3. The S-polarized component Ls3 is included in the detection light L2 incident from the direction opposite to the fourth direction Z4.

When the first polarized component is the S-polarized component and the second polarized component is the P-polarized component, the polarization beam splitter 23 reflects much of the S-polarized component, and allows much of the P-polarized component to pass therethrough. Therefore, for example, as illustrated in FIG. 4, 99.5% of the illumination light L1 may be provided as the S-polarized component Ls1 that is dominant, and the remaining 0.5% may be provided as the P-polarized component Lp1. As illustrated in FIG. 4, the polarization beam splitter 23 reflects almost all the dominant S-polarized component Ls1, and emits the reflected S-polarized component Ls1 towards the light valve 21. The S-polarized component Ls1 incident on the light valve 21 is modulated (turned) by the light valve 21 to be the modulated light that is the P-polarized component Lp2. The P-polarized component Lp2 is then incident on the projection lens 24 through the polarization beam spinier 23. The P-polarized component Lp2, which is the modulated light, is projected on the projection plane 30A of the screen 30 through the projection lens 24 as the projected image V2, as illustrated in FIG. 3.

On the other hand, the detection light L2 incident on the polarization beam splitter 23 is substantially natural light, and the S-polarized component Ls3 and the P-polarized component Lp3 are each included as a polarized component thereof by 50%. The polarization beam splitter 23 reflects almost all the S-polarized component Ls3 in the third direction Z3. Assuming that the polarizer 25 removes the P-polarized component, almost all the reflected S-polarized component Ls3 reaches the image pickup device 22. On the other hand, of the illumination light L1 incident on the polarization beam splitter 23, the P-polarized component Lp1 is emitted in the third direction Z3. The P-polarized component Lp1 becomes a noise component with respect to the detection light L2, and when the P-polarized component Lp1 is incident on the image pickup device 22, the S/N ratio at the time of detection becomes small, which reduces detection accuracy. It is possible to enhance the detection accuracy by increasing the S/N ratio, by disposing the polarizer 25 to remove the P-polarized component Lp1.

As illustrated in Table 1 and FIG. 2, in the case of using the wire grid 27, projection light (the S-polarized component Ls2) is 83%*75%*R with respect to the P-polarized component Lp1 forming 99.5% of the illumination light L1, which is inferior to that in the case of using the polarization beam splitter 23. However, in the wire grid 27, the transmittance of the P-polarized component is stably zero irrespective of conditions of an optical design. Therefore, this may be a design achieving a balance, to obtain a detection signal normally.

On the other hand, in the case of the polarization beam splitter 23, depending on a condition (an incident angle) of an optical design or performance of a polarized-light separation film, the first polarized component may also be allowed to pass therethrough, although a proportion thereof is extremely small. Consideration is necessary for this situation. Second and third modifications as well as a second embodiment to be described below are effective at stably obtaining a detection signal, even in such a situation.

(1.4.2 Second Modification)

Figure 5:
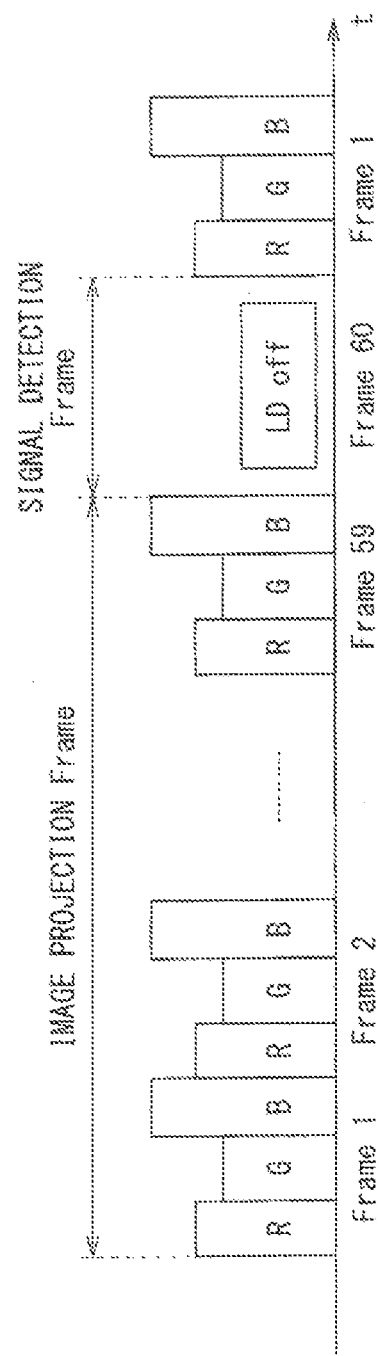
FIG. 5 is an explanatory diagram illustrating an example of control of illumination light in a projection display according to a second modification of the first embodiment.

As described above, when the polarization beam splitter 23 is used as the polarized-light separation device, the S-polarized component Ls1 of the passing illumination light L1 may reach the image pickup device 22. Therefore, in the second modification, when the polarization beam splitter 23 is used as the polarized-light separation device, the S-polarized component Ls1 of the illumination light L1 is removed by a method of turning off the light source of me illumination section 1, at the time of detection, as illustrated in FIG. 5. Usually, a projector causes light sources to perform temporally-sequential light emission in order of RGBRGB, by using a field sequential method, as illustrated in FIG. 5.

In the configuration example of FIG. 1, the illumination control section 29 controls light emission of the blue laser 11B, the green laser 11G, and the red laser 11R by using the field sequential scheme, as the first to the third light sources, respectively. When a frame rate of an image to be projected is 60 fps, this set of RGB is repeated 60 times per second. The illumination from the light source on the image pickup device 22 is allowed to be zero, by performing complete turning-off at one of the 60 times. In this case, as illustrated in FIG. 5, for example, the illumination control section 29 may control the light emission of the first to the third light sources, so that a first frame 1 to a 59th frame 59 form an image projection frame (a first light emission period) in which light is emitted in illumination necessary for image projection. Further, the illumination control section 29 may control the light emission of the first to the third light sources, so that a 60th frame 60 forms a signal detection frame (a second light emission period). In this case, brightness as the projector is merely 59/60 and therefore, the brightness is not significantly affected. In addition, shutter time is 1/60 per second, which is sufficient as image-pickup time on the detection side and therefore, sufficient sensitivity is achieved by using an ordinary CMOS or the like. Hence, it is possible to detect where the position P1 of the feature point of the indicator 71 such as a finger of a person and a pointer is, by using a passive method.

(1.4.3 Third Modification)

Figure 6:
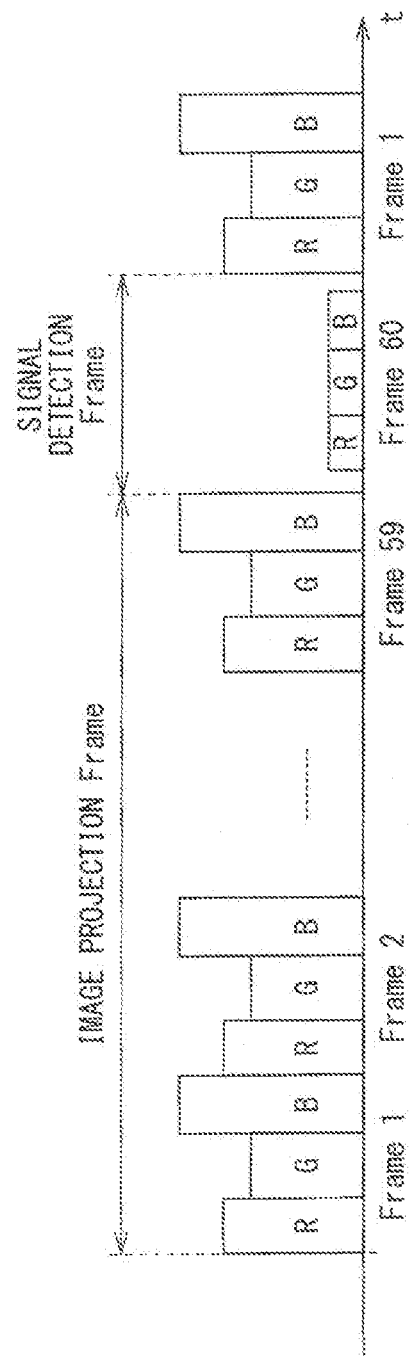
FIG. 6 is an explanatory diagram illustrating an example of control of illumination light in a projection display according to a third modification of the first embodiment.

FIG. 6 illustrates an example of control of illumination light in a projection display according to a third modification of the first embodiment. In the above-described second modification, the light sources are turned off (the illumination is made to be zero) in the signal detection frame (the second light emission period). However, in the third modification, light emission is controlled to decrease illumination in a range in which the illumination does not become zero. To be more specific, the illumination control section 29 controls the light emission of the first to the third light sources as follows. In the signal detection frame (the second light emission period), the illumination is decreased in the range in which the illumination does not become zero, as compared with the illumination in the image projection frame (the first light emission period). According to this method, even when the projection display is used in an almost completely dark room, it is possible to detect the position P1 of the feature point of the indicator 71, by using the illumination light in the reduced illumination.

(1.4.4 Fourth Modification)

Figure 7:
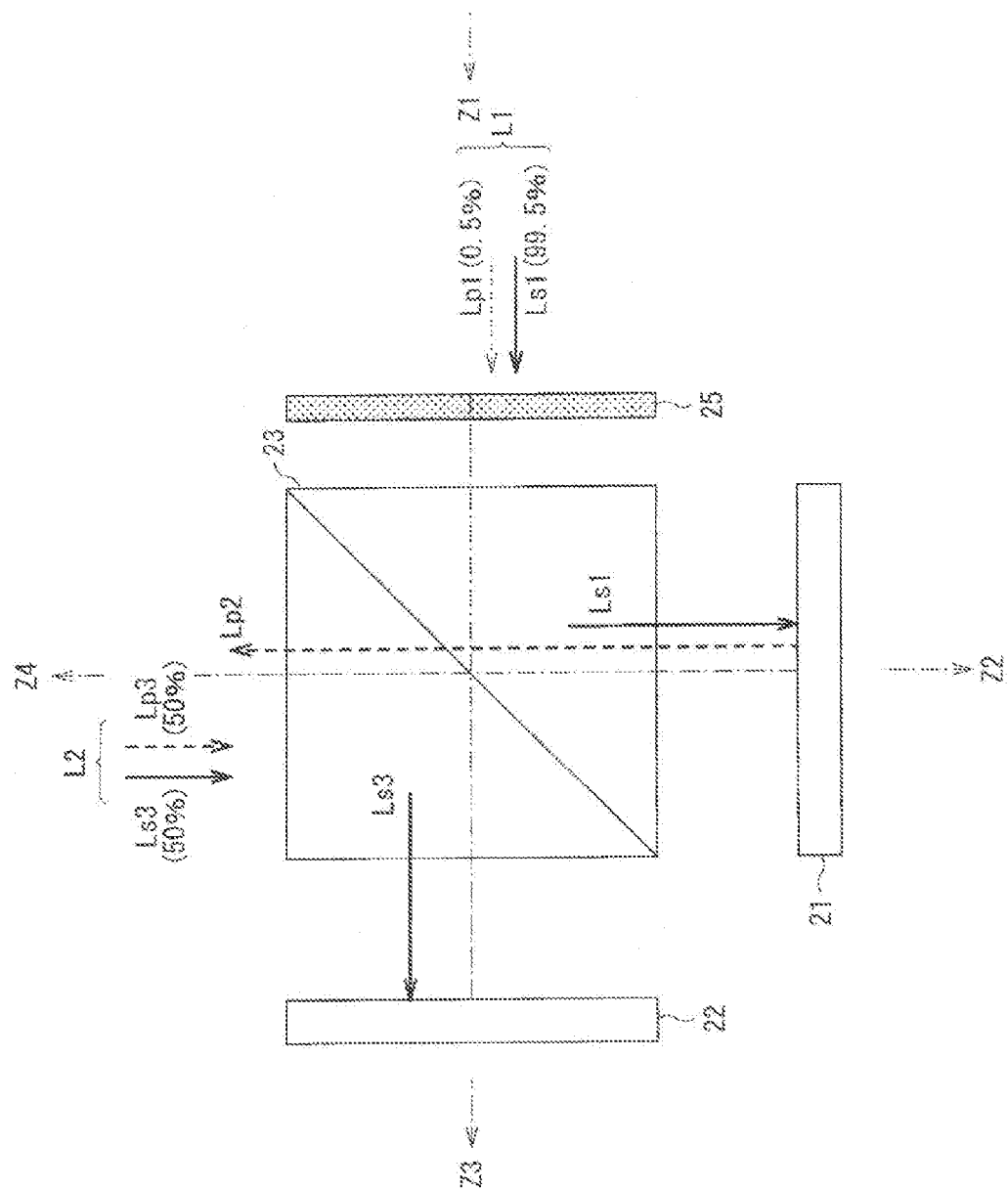
FIG. 7 is a cross-sectional diagram illustrating a main part configuration of a projection display according to a fourth modification of the first embodiment, together with a state of light incident on each of a light valve and an image pickup device.

FIG. 7 illustrates a main part configuration of a projection display according to a fourth modification of the first embodiment, together with a state of light incident on each of the light valve 21 and the image pickup device 22. The fourth modification is similar to the configuration in FIG. 4, except that the polarizer 25 is disposed between the illumination section 1 and the polarization beam splitter 23.

2. Second Embodiment 2.1 Configuration and Functions

Figure 8:
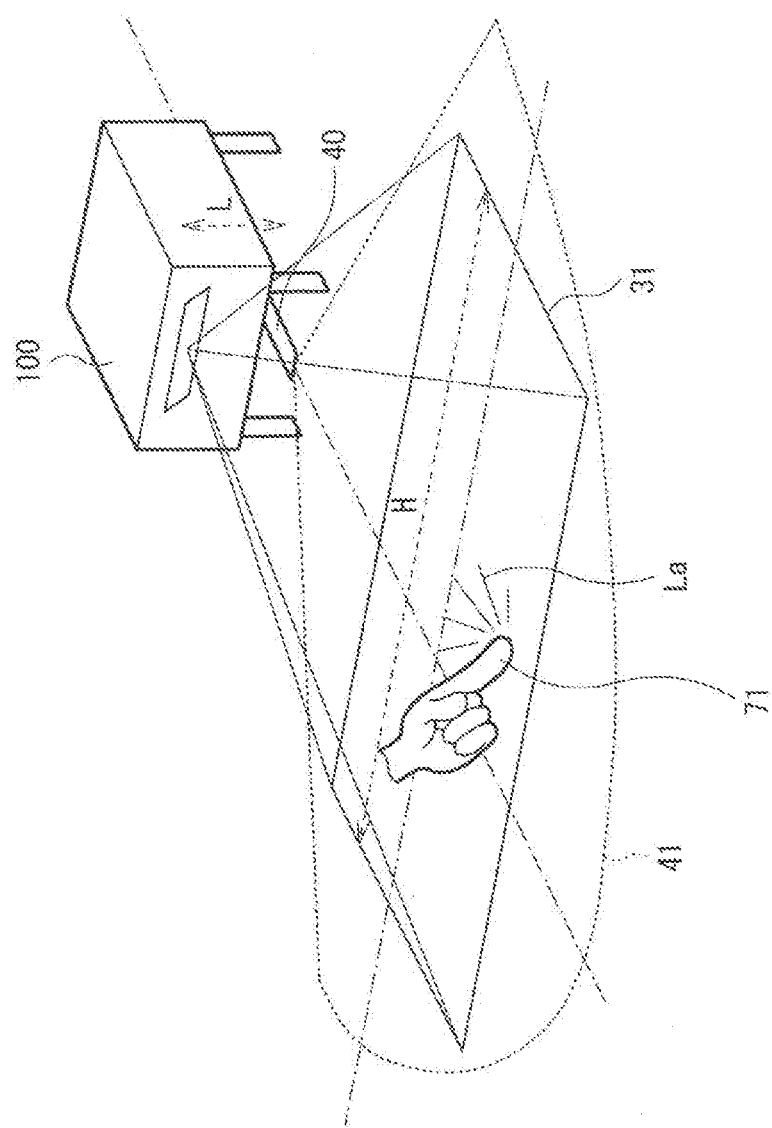
FIG. 8 is a configuration diagram illustrating as example of an overall configuration of a projection display according to a second embodiment.
Figure 9:
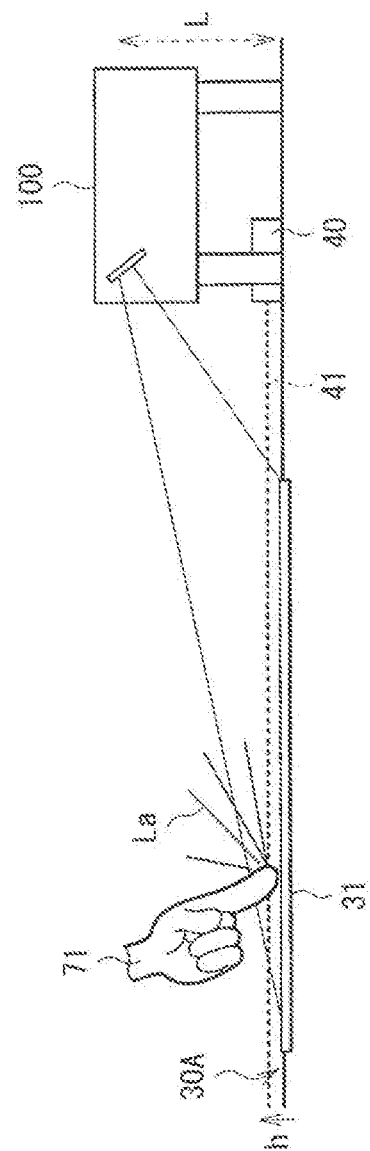
FIG. 9 is a configuration diagram illustrating a state of the projection display according to the second embodiment, when viewed from a side-face direction.
Figure 10:
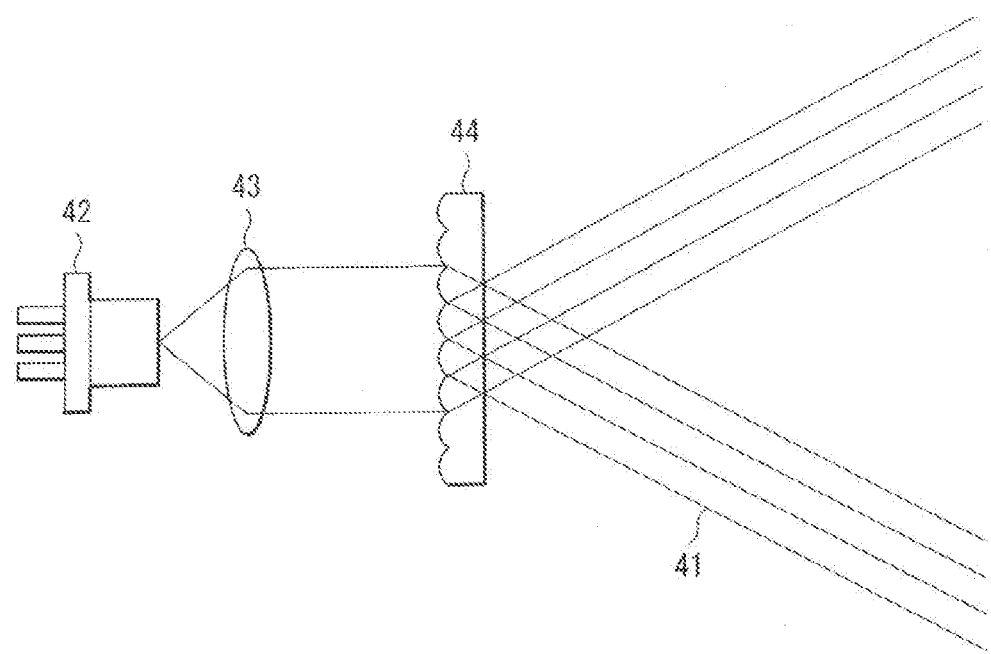
FIG. 10 is a cross-sectional diagram illustrating a configuration example of a near-infrared-light emission section in the projection display according to the second embodiment.
Figure 13:
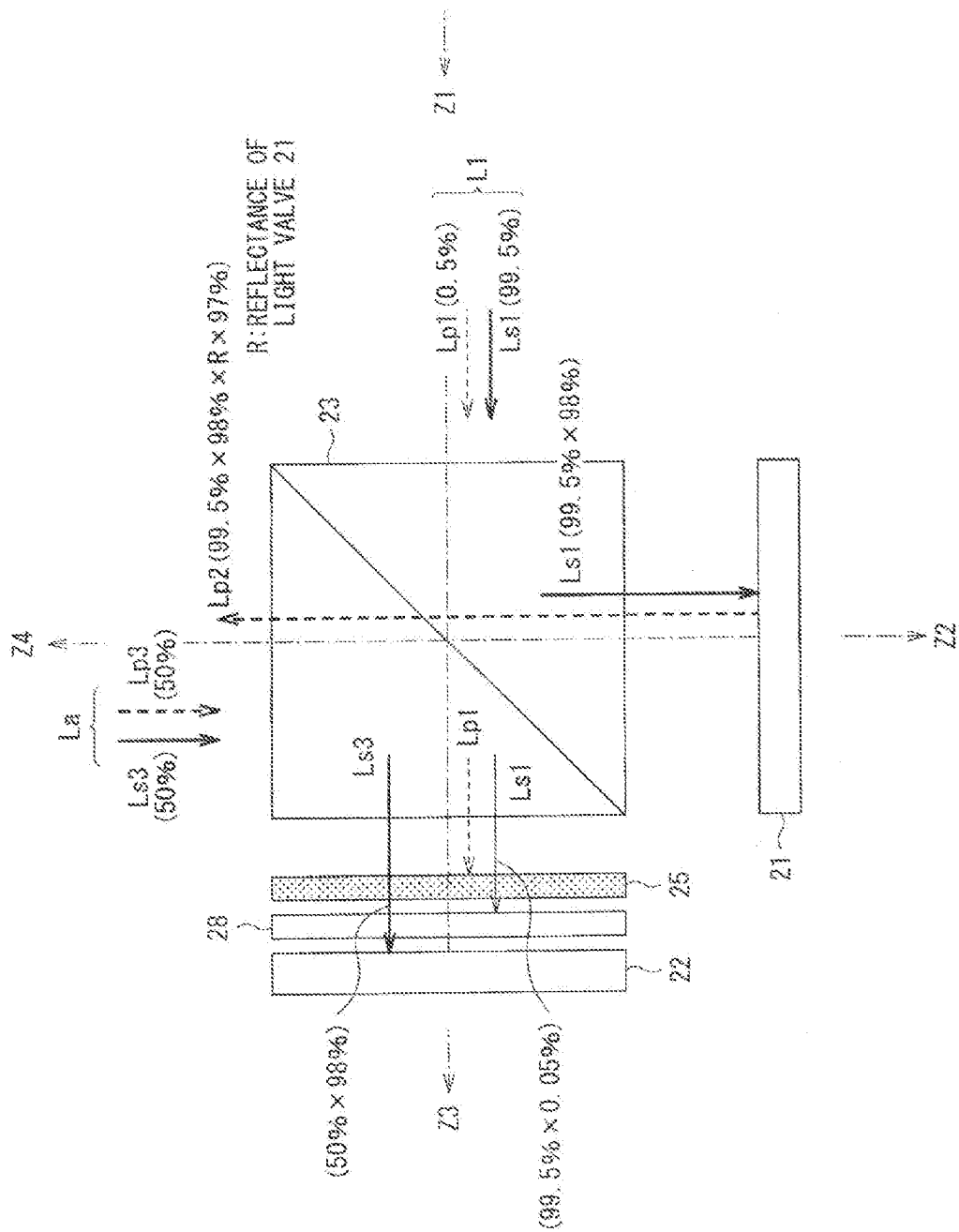
FIG. 13 is a cross-sectional diagram illustrating a main part configuration of the projection display according to the second embodiment, together with a state of light incident on each of a light valve and an image pickup device.

FIG. 8 illustrates an example of an overall configuration of a projection display according to the second embodiment. FIG. 9 illustrates a state of this projection display when viewed from a side-face direction. FIG. 10 illustrates a configuration example of a near-infrared-light emission section 40 in this projection display. FIG. 13 illustrates a main part configuration of this projection display, together with a state of light incident on each of the light valve 21 and the image pickup device 22. It is to be noted that, in the present embodiment, a case in which the polarization beam splitter 23 is used as the polarized-light separation device will be described as an example.

The present embodiment relates to a projection display having a function of actively performing object detection, by using near-infrared light. In the method of passive object detection by the above-described first embodiment, a simple configuration is provided, but a load of the image processing may be large. It may be necessary to perform processing on the position, shape, coordinate information, etc. of a finger or the like, in real time. According to the present embodiment, it is possible to ease such processing. In the following, a configuration assuming that a short focus type is used as the projection display will be described.

This projection display includes the near-infrared-light emission section 40 below a main body section 100 as illustrated in FIGS. 8 and 9. The projection plane 30A may be, for example, a flat floor. The near-infrared-light emission section 40 is a detection light source that emits a detection near-infrared light 41 as non-visible light for detection. The near-infrared-light emission section 40 emits the detection near-infrared light 41, so that at least the projection area 31 on the projection plane 30A is covered by the detection near-infrared light 41 from a predetermined height h. On the image pickup device 22, near-infrared scattering light La scattered by the indicator 71 is incident as detection light through the projection lens 24 and the polarization beam splitter 23, as illustrated in FIG. 13. This projection display further include a visible-light cut filter 28 disposed between the polarization beam splitter 23 and the image pickup device 22, as illustrated in FIG. 13. The visible-light cut filter 28 reduces a visible range to a few percent, depending on characteristics.

Figure 11:
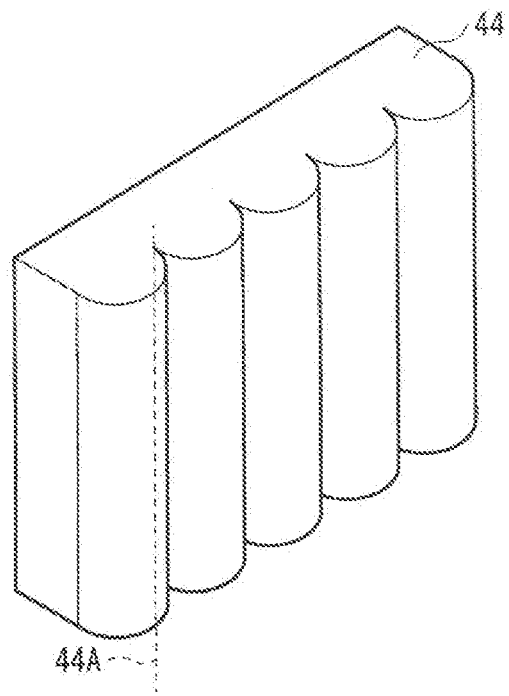
FIG. 11 is a perspective view illustrating a first configuration example of a cylindrical array lens.
Figure 12:
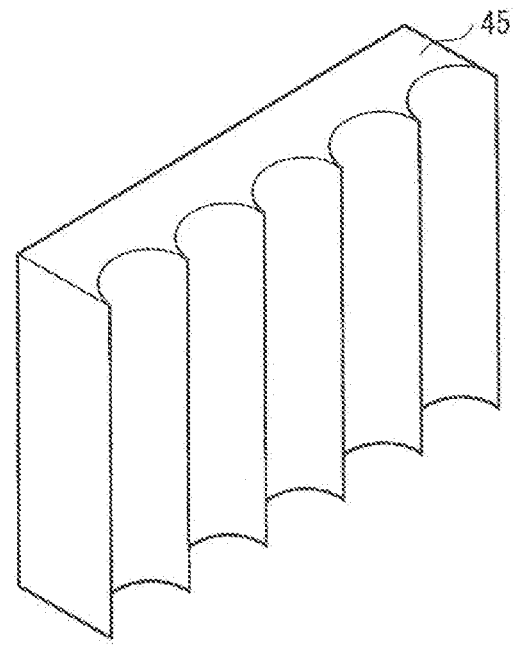
FIG. 12 is a perspective view illustrating a second configuration example of the cylindrical array lens.

The near-infrared-light emission section 40 includes a near-infrared laser 42, a collimator lens 43, and a cylindrical array lens 44, as illustrated in FIG. 10. The cylindrical array lens 44 includes a plurality of convex cylindrical leases arranged as illustrated in FIG. 11. The cylindrical array lens 44 is disposed so that a generatrix 44A of the cylindrical lens is directed to a surface perpendicular to the projection plane 30A. It is to be noted that, in place of the convex cylindrical array lens 44, a cylindrical array lens 45 including a plurality of concave cylindrical lenses arranged as illustrated in FIG. 12 may be used.

Figure 14:
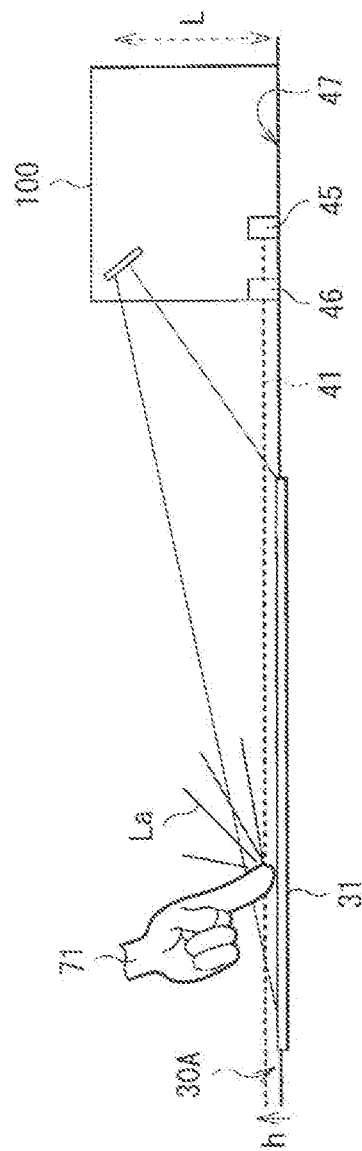
FIG. 14 is a configuration diagram illustrating another configuration example of the overall configuration of the projection display according to the second embodiment.

It is to be noted that, as illustrated in FIG. 14, for example, this projection display may have a configuration in which a detection light-source section 45 and a detection light-transmission section 46 are incorporated as the near-infrared-light emission section 40, into an outer casing of the main body section 100. In this case, the main body section 100 may be installed so that a predetermined surface (a housing undersurface 47) of the outer casing is coplanar with the projection plane 30A.

In this projection display, the projection lens 24 may be a super short focus lens in which a throw ratio is 0.38 or less. Here, the throw ratio may be expressed as L/H, where a distance from the projection lens 24 to the projection plane 30A is L, and a width of the protection area is H, as illustrated in FIGS. 8, 9, and 14.

In this projection display, as illustrated in FIGS. 8 and 9, a film-like near infrared barrier (a detection field of non-visible light) may be provided in the projection area 31, at the height h of a few millimeters to tens of millimeters from the projection plane 30A, for example, over a range of 2 nm to 3 mm in a height direction and covering the projection area 31 in an area direction. In other words, the near-infrared light may be so emitted as to cut across a light flux of the projection light at the height h from the projection plane 30A. Then, usually, since the projection plane 30A is flat, the film of the emitted near-infrared light travels straight without being blocked, unless an obstruction or the indicator 71 such as a finger and a pointer is present. Therefore, the film does not appear in the image pickup device 22 that monitors the projection plane 30A. In this state, when a finger or the like is brought a few millimeters in proximity to the projection plane 30A, or an action such as touching the projection plane 30A is taken, the light of the barrier is blocked by the finger and scatters at that point. The light scattering upon hitting the finger travels in all directions, and a part of the light returns to an opening of the projection lens 24. This returning light reaches the image pickup device 22, after passing through the projection lens 24 and then passing through the polarization beam splitter 23. At this moment, the light valve 21 and the image pickup device 22 forming an image are disposed at the conjugate positions. Therefore, bright-spot scattering points generated like dots on the projection plane 30A form an image on the image pickup device 22, which image is formed at a position in a 1:1 correspondence with the projected image. It is possible to detect the position by doing so. In addition, the super short focus type has such an advantage that it is easy to view a screen when performing operation, because the projection light passes in proximity to the projection plane 30A and resists being blocked by a part of a body of a person performing the operation.

Further, in this projection display, as illustrated in FIG. 13, the visible-light cut filter 28 is further provided. Therefore, even when the polarization beam splitter 23 is used as the polarized-light separation device, it is possible to cut much of the illumination light L1 incident on the image pickup device 22 side, without turning off the light sources of the illumination section 1. This makes it possible to allow substantially only the detection light (the near-infrared scattering light La) to be incident on the image pickup device 22 side, and to enhance the detection accuracy by increasing the S/N ratio.

Here, an example of characteristics of the polarization beam splitter 23 is provided in Table 2. It is to be noted that Tp indicates transmittance of the P-polarized component, and Ts indicates transmittance of the S-polarized component. Rp indicates reflectance of the P-polarized component, and Rs indicates reflectance of the S-polarized component.

[Table 2]

Here, as provided in Table 2, the polarization beam splitter 23 is superior, in terms of the reflectance of the S-polarized component and the transmittance of the P-polarized component. Therefore, as illustrated in FIG. 13, the projection light (the P-polarized component Lp2) is 98%*97%*R (R is reflectance of the light valve 21), with respect to the S-polarized component Ls1 that is 99.5% of the illumination light L1. Hence, it is possible to use the projection light very effectively, without loss. Therefore, the polarization beam splitter 23 is suitable for configuration of a bright projector. However, on the other hand, some transmittance of the S-polarized component also exists, which is 0.05%. When pointing operation is performed, even if the polarizer 25 is disposed in a state of cutting the P-polarized component of the light traveling towards the image pickup device 22 side, 99.5%*0.05% of the S-polarized component Ls1 of the illumination light L1 passing through the polarization beam splitter 23 is generated, besides the S-polarized component Ls3 of the detection light L2. When reaching the image pickup device 22 on the above-described condition, this component becomes about some hundreds of lux of unnecessary light.

On the other hand, the illumination on the image pickup device 22 of the detected near-infrared scattering light La depends on an output of the near-infrared laser 42 and reflectance of the indicator 71, but is experimentally some hundreds of lux in a state in which a laser output is 100 mW. Therefore, even if the S-polarized component Ls1 serving at the first polarized component passes through the polarization beam splitter 23, it is possible to achieve a sufficient S/N ratio, by using the visible-light cut filter 28 and the polarizer 25. Specifically, the visible-light cut filter 28 is provided between the illumination section 1 and the image pickup device 22, to reduce the first polarized component to about 10 lux, and the P-polarized component Lp1 serving as the second polarized component is reduced by the polarizer 25.

2.2 Modifications of Second Embodiment (2.2.1 First Modification)

Figure 15:
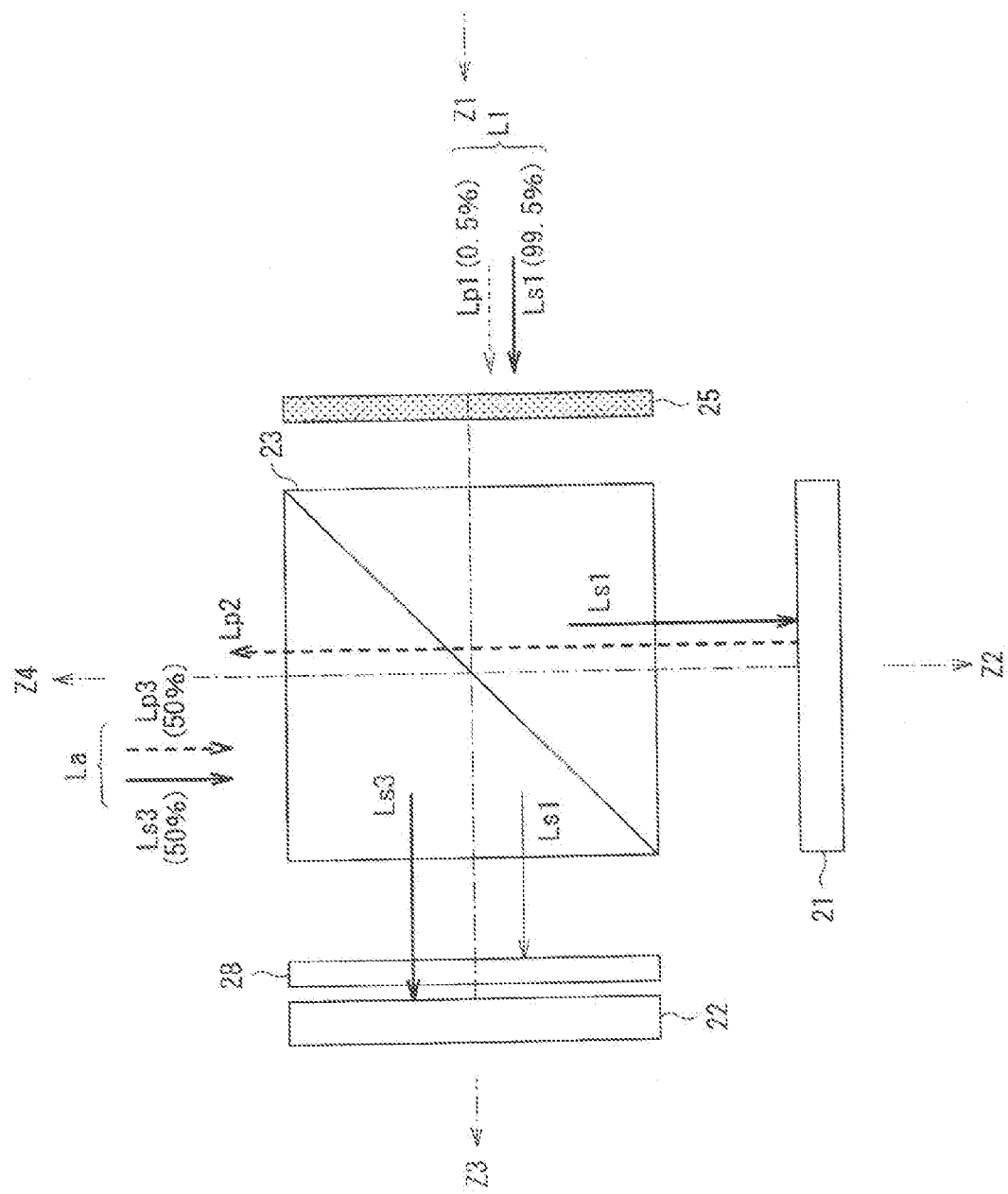
FIG. 15 is a cross-sectional diagram illustrating a first modification of the main part configuration of the projection display according to the second embodiment, together with a state of light incident on each of the light valve and the image pickup device.

FIG. 15 illustrates a first modification of the main part configuration of the projection display according to the second embodiment, together with a state of light incident on each of the light valve 21 and the image pickup device 22. This first modification has a configuration similar to the configuration in FIG. 13, except that the polarizer 25 is disposed between the illumination section 1 and the polarization beam splitter 23.

(2.2.2 Second Modification)

Figure 16:
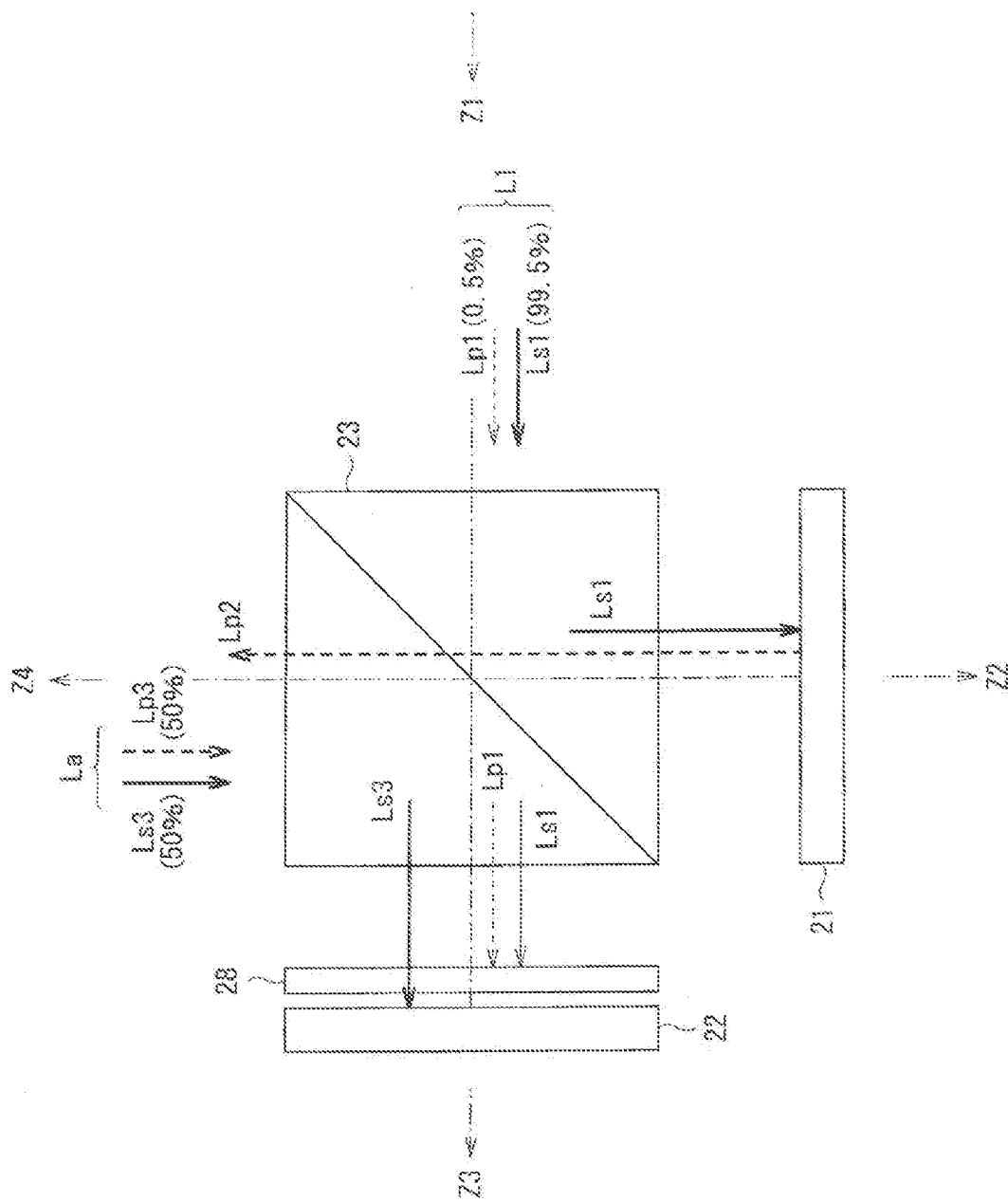
FIG. 16 is a cross-sectional diagram illustrating a second modification of the main part configuration of the projection display according to the second embodiment, together with a state of light incident on each of the light valve and the image pickup device.

FIG. 16 illustrates a second modification of the main part configuration of the projection display according to the second embodiment, together with a state of light incident on each of the light valve 21 and the image pickup device 22. This second modification has a configuration similar to the configuration in FIG. 13, except that the polarizer 25 is removed from the configuration. Even when the polarizer 25 is removed from the configuration, it is possible to achieve a sufficient S/N ratio, for example, by disposing a plurality (for example, two) of the visible-light cut filters 28. Both the P-polarized component Lp1 and the S-polarized component Ls1 of the illumination light L1 incident on the image pickup device 22 are reduced by the visible-light cut filters 28.

3. Third Embodiment

The present embodiment relates to a projection display having a relay optical system on the image pickup side. The projection display according to the present embodiment further includes one or more relay lens groups each having positive power, between the image pickup device 22 and the polarized-light separation device. In the following, the projection display including the relay optical system in the configuration of the second embodiment will be taken as an example, hut this projection display is also applicable to the configuration of the first embodiment.

3.1 First Configuration Example

Figure 17:
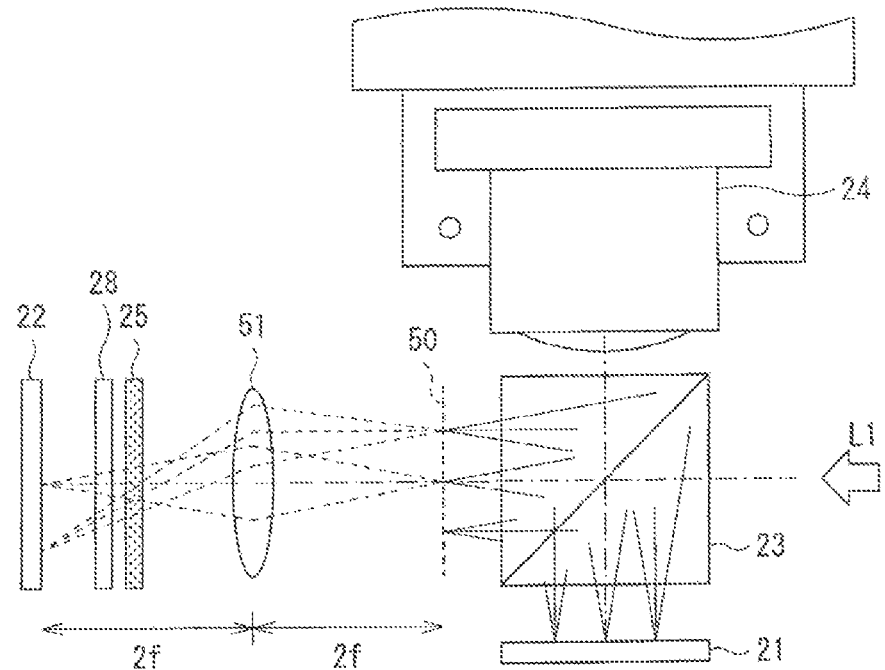
FIG. 17 is a cross-sectional diagram illustrating a first example of a main part configuration of a projection display according to a third embodiment, together with a state of light incident on each of a light valve and an image pickup device.

FIG. 17 illustrates a first example of a main part configuration of a projection display according to the present embodiment, together with a state of light incident on each of the light valve 21 and the image pickup device 22. As illustrated in FIG. 17, a relay lens group 51 is provided between the Image pickup device 22 and the polarization beam splitter 23. The relay lens group 51 has positive power, and includes at least one lens. When a focal length of the relay lens group 51 is "f", the relay lens group 51 is disposed at a position of 2 f away from a conjugate plane 50 of the light valve 21, immediately behind the polarization beam splitter 23. Further, the image pickup device 22 is disposed at a position of 2 f away therefrom, so that it is possible to perform object detection substantially similar to object detection in a case in which the image pickup device 22 is disposed at the conjugate plane 50. It is possible to obtain positional flexibility, by forming a conjugate point at a distant position. Further, the relay lens group 51 forms a one-side telecentric optical system in which substantial telecentricity is provided between the relay lens group 51 and the polarization beam splitter 23.

3.2 Second Configuration Example

Figure 18:
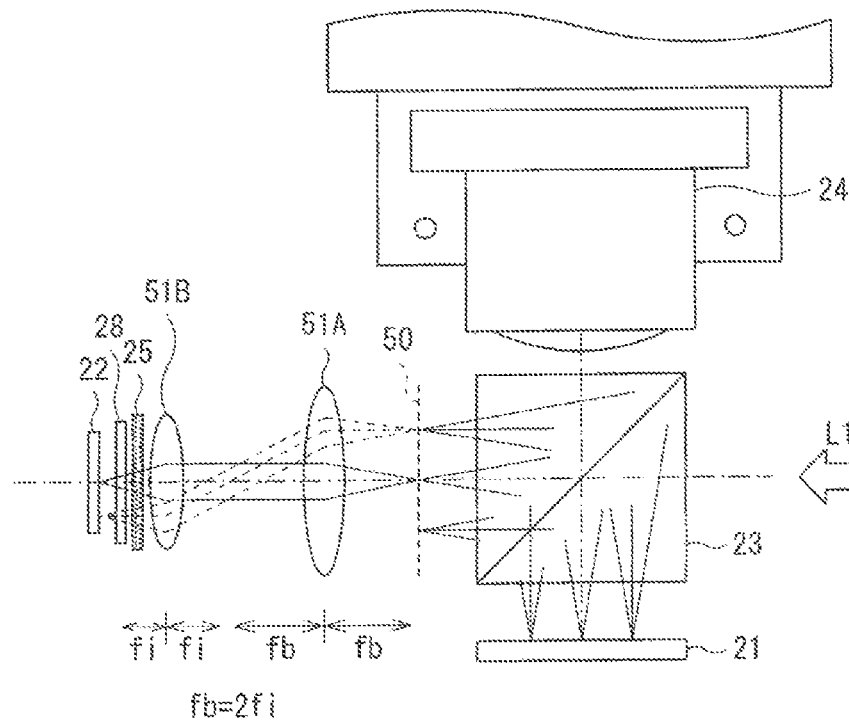
FIG. 18 is a cross-sectional diagram illustrating a second example of the main part configuration of the projection display according to the third embodiment, together with a state of light incident on each of the light valve and the image pickup device.

FIG. 18 illustrates a second example of the main part configuration of the projection display according to the present embodiment, together with a state of light incident on each of the light valve 21 and the image pickup device 22.

In the configuration in FIG. 18, in place of the relay lens group 51 in the configuration in FIG. 17, a first relay lens group 51A and a second relay lens group 51B are provided in this order from a side close to the polarization beam splitter 23. A focal length fi of the second relay lens group 51B is smaller than a focal length fb of the first relay lens group 51A.

Using the first relay lens group 51A and the second relay lens group 51B, a reduction optical system of a reduction magnification B (beta), which is B=fi/fb, is configured. Further, a relationship of Li>B*Lb is satisfied by an effective area Li of the image pickup surface of the image pickup device 22 and an effective area Lb of the display surface of the light valve 21.

For example, a condition of 2 fi=fb is assumed. Also, the first relay lens group 51A may be disposed at a position of fb away from the conjugate plane 50 of the light valve 21, the second relay lens group 51B may be disposed at a position of fb+fi away therefrom, and the image pickup device 22 may be disposed at a position away only by fi from the second relay lens group 51B. In this case, the position of the image pickup device 22 is equivalent to the conjugate plane 50 and in addition thereto, it is possible to form a 0.5× reduction optical system, so that object detection by using the image pickup device 22 of a small type is achievable. This provides a great advantage in terms of cost. The cost of the image pickup device 22 is greatly influenced by the size of the image pickup device 22. The cost of the light valve 21 and the image pickup device 22, which are semiconductor components, is large in configuring a projector. Attempting to downsize such a component greatly contributes to the cost. In addition, the first relay lens group 51A and the second relay lens group 51B form a both-side telecentric optical system, in which substantial telecentricity is provided between the first relay lens group 51A and the polarization beam splitter 23, and provided between the second relay lens group 51B and the image pickup device 22.

3.3 Third Configuration Example

Figure 19:
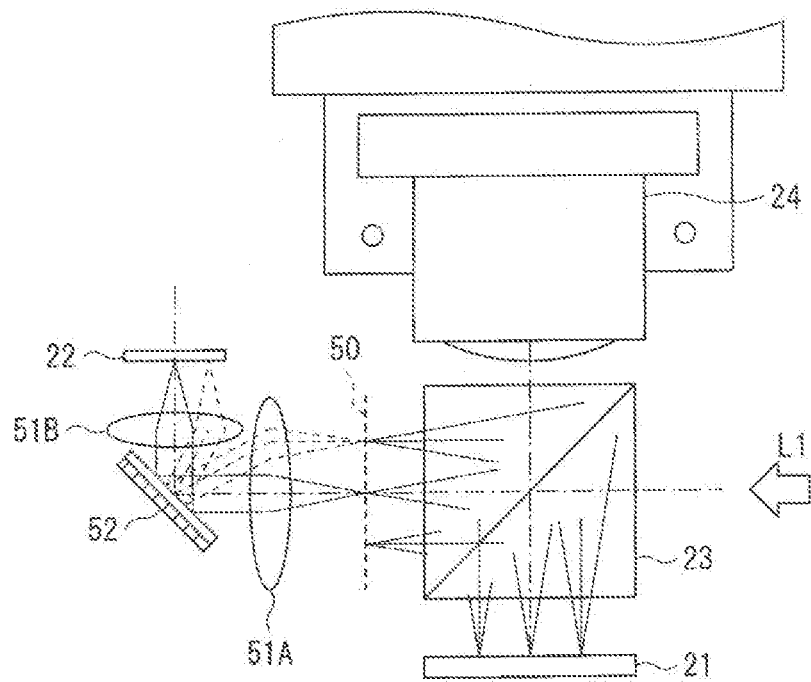
FIG. 19 is a cross-sectional diagram illustrating a third example of the main part configuration of the projection display according to the third embodiment, together with a state of light incident on each of the light valve and the image pickup device.

FIG. 19 illustrates a third example of the main part configuration of the projection display according to the present embodiment, together with a state of light incident on each of the light valve 21 and the image pickup device 22. Between the image pickup device 22 and the polarization beam splitter 23, one or more reflecting mirrors each having polarization-selectivity and wavelength-selectivity may be disposed as a polarizing member. The reflecting mirror reflects, towards the image pickup device 22, the detection light incident through the projection lens 24 and the polarization beam splitter 23. In the configuration example in FIG. 19, a hot mirror 52 having polarization-selectivity and wavelength-selectivity is disposed between the first relay lens group 51A and the second relay lens group 51B.

Flexibility of placement is increased by extending the conjugate point in a relay optical system. By forming a distance between the components, it is possible to achieve a folding optical system therebetween with the reflecting mirror or the like. This reflecting mirror not only increases the flexibility of placement, but also reduces components of the visible-light cut filter 28 and the polarizer 25. By providing the reflecting mirror with such characteristics that the S-polarized component is reflected and the P-polarized component is allowed to pass therethrough, it is possible to cut the P-polarized component from the illumination section 1, the P-polarized component being an unnecessary light component of light reaching the image pickup device 22. It is not necessary to provide the polarizer 25 separately. Further, the reflecting mirror is allowed to also serve as the visible-light cut filter 28, by providing the reflecting mirror with such spectral characteristics that visible wavelength region reflectance is reduced and only a near-infrared wavelength region is reflected, which is called a hot mirror.

4. Fourth Embodiment

The present embodiment relates to a projection display having a function of detecting an object by using near-infrared light, like the second and the third embodiments. In the following, description of configurations and functions similar to those of the second and the third embodiments will be omitted as appropriate.

4.1 Basics Configuration Example

Figure 20:
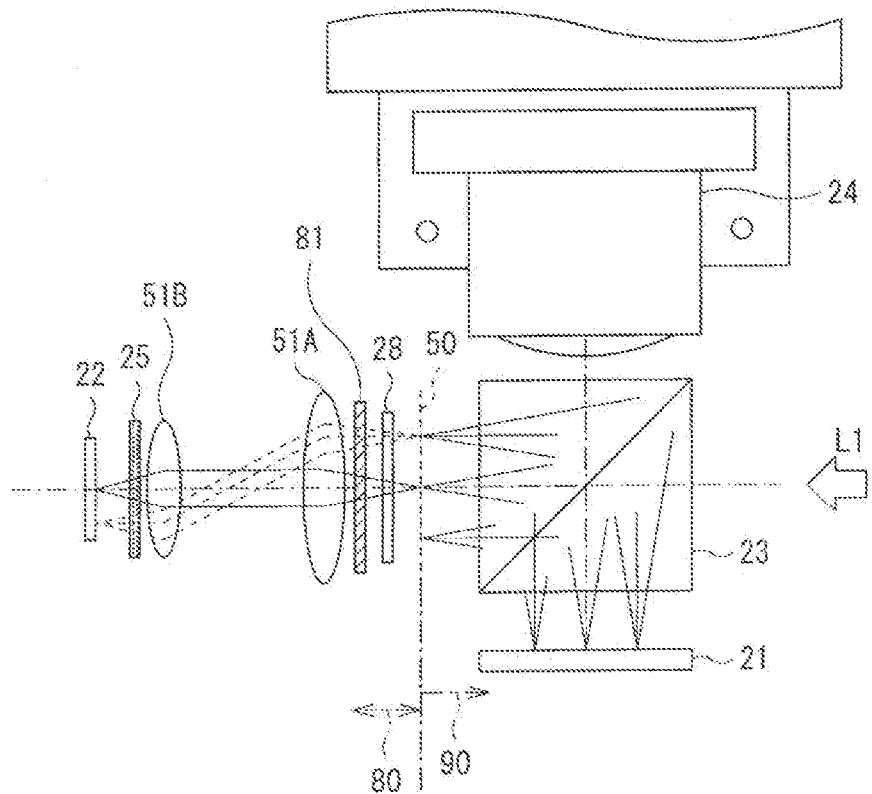
FIG. 20 is a cross-sectional diagram illustrating a first example of a main part configuration of a projection display according to a fourth embodiment, together with a state of light incident on each of a light valve and an image pickup device.

FIG. 20 illustrates a first example of a main part configuration of a projection display according to the present embodiment together with a state of light incident on each of the light valve 21 and the image pickup device 22. In the configuration example of FIG. 20, a both-side telecentric optical system including the first relay lens group 51A and the second relay lens group 51B is formed between the image pickup device 22 and the polarization beam splitter 23, in a manner similar to that of the configuration example illustrated in FIG. 18. It is to be noted that in the following, an optical system between the conjugate plane 50 of the light valve 21 and the image pickup device 22 will be referred to as a detection optical system 80. Further, an optical system contributing to image display, except the detection optical system 80, will be referred to as a projection optical system 90.

In the configuration example in FIG. 20, in addition to the polarizer 25 and the visible-light cut filter 28, a bandpass filter 81 is further provided as an optical member used to reduce a light component becoming unnecessary at the time of object detection. The polarizer 25 is disposed between the image pickup device 22 and the second relay lens group 51B. As described above in the second embodiment the polarizer 25 suppresses arrival of the P-polarized component Lp1 serving as the second polarized component at the image pickup device 22, of the illumination light L1 incident on the polarization beam splitter 23. The bandpass filter 81 and the visible-light cut filter 28 may be preferably disposed between the polarization beam splitter 23 and the first relay lens group 51A, for a reason to be described later.

In the configuration example in FIG. 20, disposing the bandpass filter 81 in an optical path of the detection optical system 80 is one of features in the projection display according to the present embodiment. In the projection display according to the present embodiment, the detection near-infrared light 41 is emitted as non-visible light for detection, from the near-infrared-light emission section 40 serving as the detection light-source section, in a manner similar to that of the second embodiment (FIG. 8). On the detection, optical system 80, the near-infrared scattering light La scattered by the indicator 71 is incident through the projection lens 24 and the polarization beam splitter 23, as the detection light. The bandpass filter 81 allows only light in a predetermined passband width centering on a predetermined emission wavelength, which is emitted by the detection light source, to pass therethrough as light in a specific wavelength region. This increases the S/N ratio with unnecessary light, thereby achieving stability of detection.

In the above-described second embodiment, since the near-infrared light is used as the detection light and the visible light is used as the light for image display, only the visible light is handled as the light unnecessary for the detection. Therefore, as illustrated in FIGS. 13, 16, etc., the unnecessary light is reduced at least by disposing the visible-light cut filter 28. Actually, however, unnecessary light may be also present, in a region other than the infrared wavelength region. In such a case, in the configuration of the second embodiment, it is difficult to separate the near-infrared light desired to be detected and unnecessary infrared light not contributing to the detection. Therefore, when a quantity of unnecessary light is large, the detection light is buried in the unnecessary light, making it difficult to ensure a sufficient S/N ratio and to perform stable detection. Even in such a case, it is possible to ensure a sufficient S/N ratio, by increasing a driving current of tire detection light source so that the quantity of the detection light becomes sufficiently larger than the quantity of the unnecessary light. However, this method may involve large power consumption and therefore application to a hand-held-type small projector may become unpreferable. Hence, in the present embodiment, there will be described a specific method used to perform stable detection without increasing the power consumption, even when the unnecessary light in the infrared, wavelength region is large.

Figure 21:
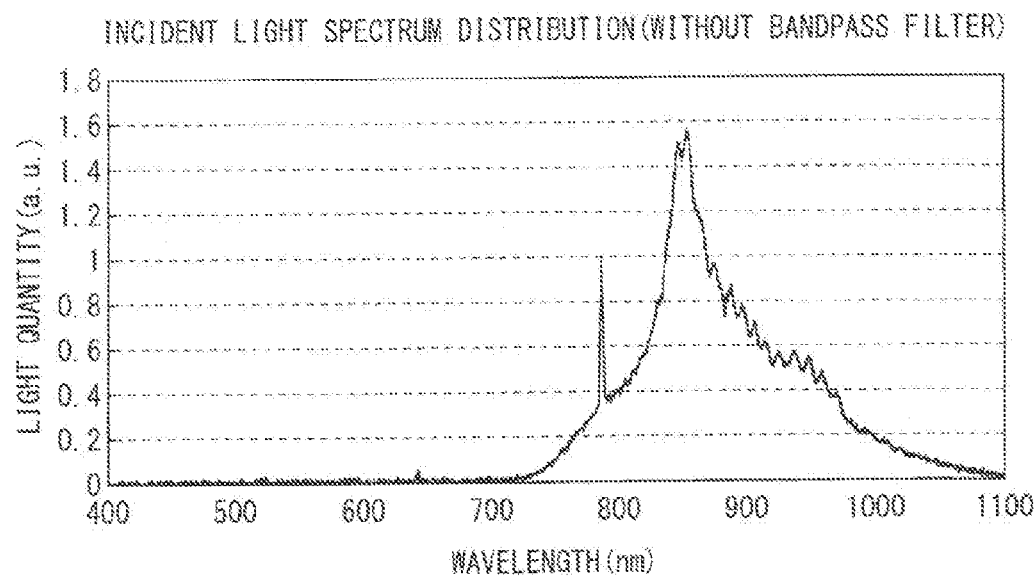
FIG. 21 is a characteristic diagram illustrating an example of spectrum distribution of light incident on the image pickup device when a bandpass filter is removed from a configuration, in the projection display illustrated in FIG. 20.

FIG. 21 illustrates an example of spectrum distribution of light incident on the image pickup device 22, when the bandpass filter 81 is removed from the configuration in the projection display illustrated in FIG. 20. In FIG. 21, a horizontal axis indicates the wavelength (nm), and a vertical axis indicates the light quantity (a.u. (arbitrary unit)). When the bandpass filter 81 is removed from the configuration, although depending on a film design and capturing efficiency of the infrared region of the optical system, a ratio (an S/N ratio) between a detection signal and unnecessary light on the image pickup device 22 in the last stage of the detection optical system 80 is about 1:10. Therefore, there is too much unnecessary light, and the detection signal is buried in noise, which makes the detection difficult. In the spectrum distribution illustrated in FIG. 21, wavelength components of the detection signal and the unnecessary light are included. In this example, since the visible-light cut filter 28 is provided, a component of visible light of RGB for image display is not present. In this example, a laser beam of 785 nm is used as the detection light-source section and therefore, a peak is at 785 nm as the detection light, and this is a signal desired to be detected. However, around 785 nm, unnecessary light is intensely present in an infrared region of 700 nm to 1,100 nm at peak of 850 nm. Since this unnecessary infrared light is present, it is difficult to detect only 785 nm of the detection signal. The unnecessary infrared light received on the image pickup device 22 is a factor that lowers the S/N ratio. Since the same wavelength components are received by the image pickup device 22 at the same time, the S/N ratio is about 1:10 when each wavelength component is integrated. Therefore, the necessary detection signal is too weak, which makes the detection difficult.

In the present embodiment, the following measures are taken to extract the necessary detection signal from the above-described unnecessary infrared light.

Here, the unnecessary infrared light includes the following three components.

1. A component included in natural light incident on the detection optical system 80 through the projection less 24

2. A component of an infrared region included in the RGB light source (the red laser 11R, the green laser 11G, and the blue laser 11B) of the illumination section 1 (FIG. 1)

3. A radiation component resulting when a visible light flux from the RGB light source of the illumination section 1 is incident on the light valve 21 and other optical component About the above-described component 1, light (natural light) from outside is small in an environment where a projector is used and therefore, it is less necessary to perceive this component as an issue. It is desirable to address the above-described components 2 and 3, or eventually only the above-described component 3.

Figure 22:
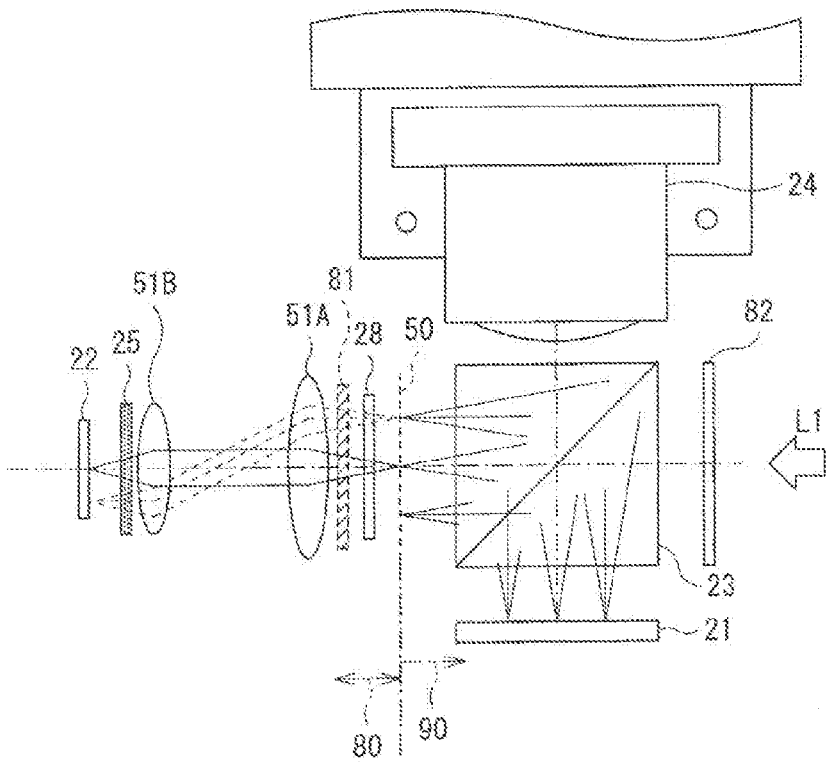
FIG. 22 is a cross-sectional diagram illustrating a second example of the main part configuration of the projection display according to the fourth embodiment, together with a state of light incident on each of the light valve and the image pickup device.
Figure 23:
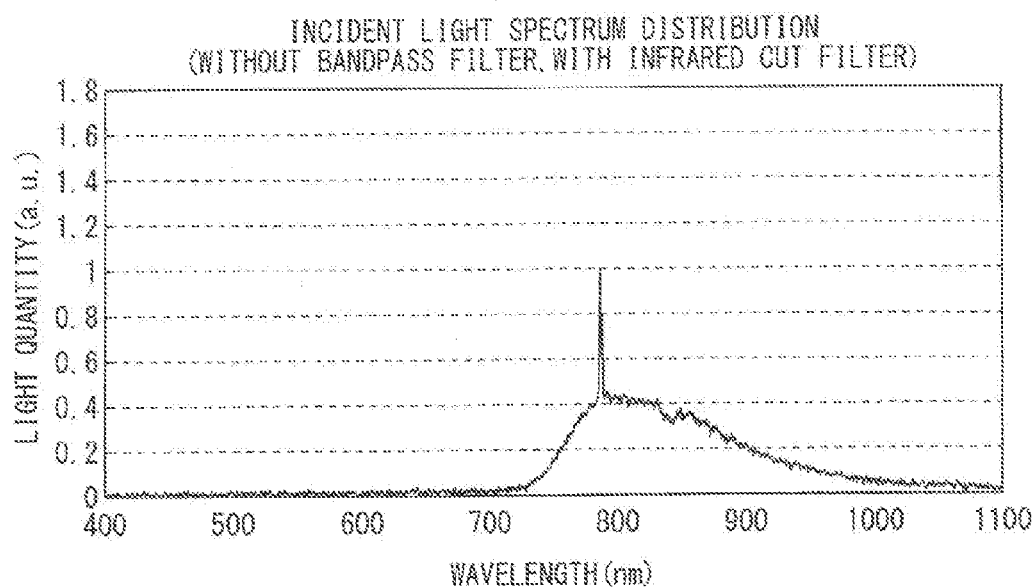
FIG. 23 is a characteristic diagram illustrating an example of spectrum distribution of light incident on an image pickup device when an infrared cut filter is disposed in a projection optical system.

Measures against, the described component 2 are as follows. Like a configuration example in FIG. 22, an infrared cut filter 82 that allows visible light to pass therethrough and reduces infrared light is provided between the illumination section 1 and the polarization beam splitter 23 in the projection optical system 90. For example, the infrared cut filter 82 may be disposed to face a surface, on which the illumination light L1 is incident, of the polarization beam splitter 23. FIG. 23 illustrates an example of spectrum distribution of light incident on the image pickup device 22, when the bandpass filter 81 is removed from the configuration and the infrared cut filter 82 is disposed, in the projection display illustrated in FIG. 20. In FIG. 23, a horizontal axis indicates the wavelength (nm), and a vertical axis indicates the light quantity (a.u.). It is apparent from FIG. 23 that the infrared unnecessary light of 800 nm or larger is reduced to a half. Disposing the infrared cut filter 82 is effective at reducing the infrared unnecessary light included in the illumination light L1. However, the S/N ratio in this state is about 1:5, indicating that the signal light is still weak and therefore, the detection is difficult. Hence, in the present embodiment a noise component is gradually reduced by using the following combination, so that a high S/N ratio is achieved by combining reduction effects of the respective measures.

Figure 24:
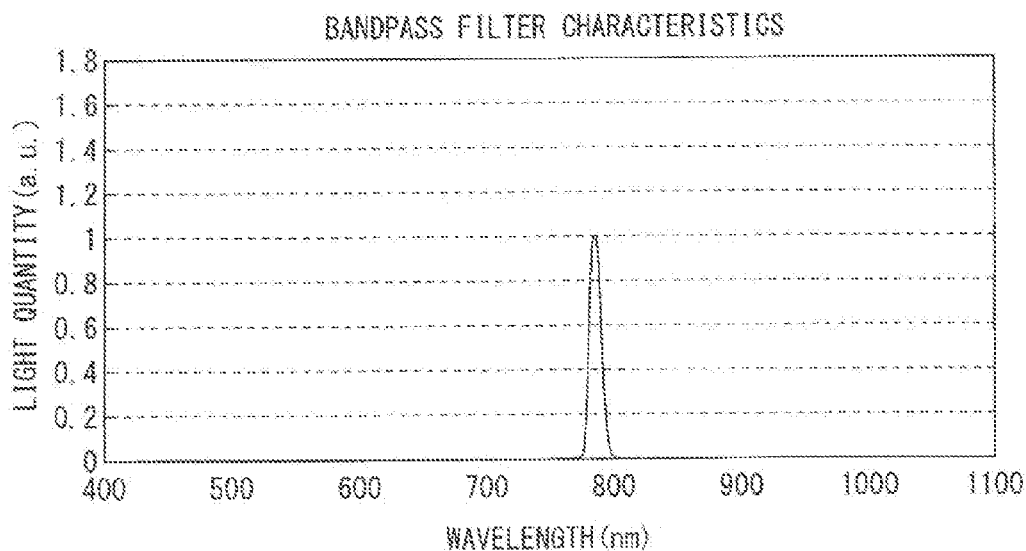
FIG. 24 is a characteristic diagram illustrating an example of wavelength characteristics of a bandpass filter.
Figure 25:
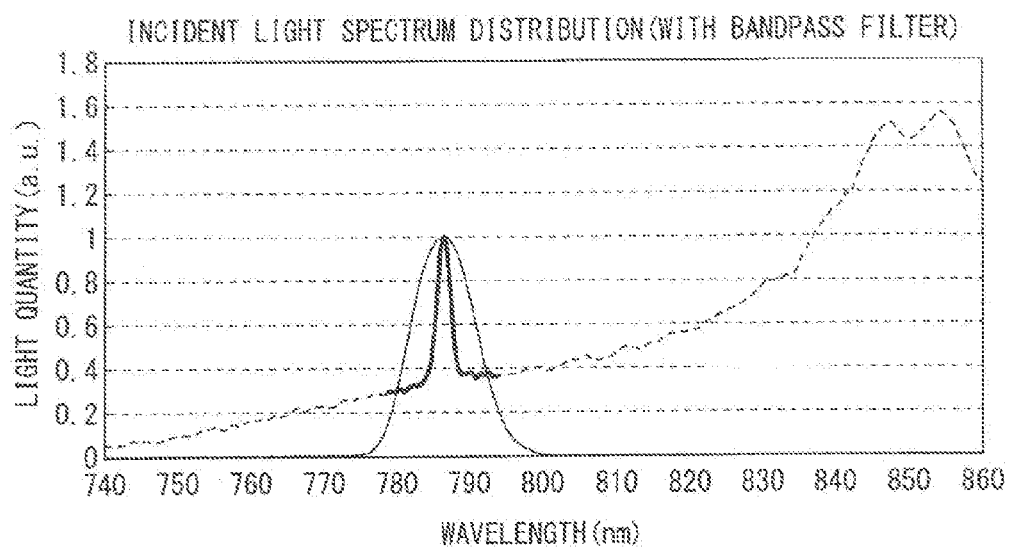
FIG. 25 is a characteristic diagram illustrating an example of spectrum distribution of light incident on the image pickup device in the projection display illustrated in FIG. 20.

Measures against the described components 2 and 3 are as follows. As illustrated in FIG. 20, the bandpass filter 81, which allows only a certain wavelength region to pass therethrough while cutting wavelength regions except this range, is disposed in the detection optical system 80. FIG. 24 illustrates an example of passband characteristics of the bandpass filter 81. FIG. 25 illustrates an example of spectrum distribution of light incident on the image pickup device 22, when the bandpass filter 81 is disposed in the detection optical system 80. In FIGS. 24 and 25, a horizontal axis indicates the wavelength (nm), and a vertical axis indicates the light quantity (a.u.). FIGS. 24 and 25 illustrate characteristics when the bandpass filter 81 having a half-value width of 10 nm is inserted. It is apparent that most of unnecessary light is allowed to be reduced on a smaller wavelength side and a longer wavelength side than a passband of 785 nm plus/minus 5 nm, and the S/N ratio is allowed to be increased to 4:1. Use of the bandpass filter 81 makes it possible to create a state in which a signal light is stronger than unnecessary infrared light.

4.2 Configuration Example Suitable for Use of Bandpass Filter 81

Here, a disadvantage that practically occurs and a solution thereto when the bandpass filter 81 is used will be discussed.

(Optimization of Placement Position of Bandpass Filter 81)

As illustrated in FIG. 20, a position where the bandpass filter 81 is to be disposed may be preferably in an optical path provided between the polarization beam splitter 23 and the first relay lens group 51A and having substantial telecentricity. As described above in the third embodiment, the image pickup device 22 of the detection system may be preferably small, in order to build a system that is inexpensive in total. In that case, it is advisable to build a reduction optical system by using a relay optical system, and to use the image pickup device 22 of a small size. The bandpass filter 81 is configured using a dielectric multilayer film in many cases, in view of performance. In this case, a passband width shifts at an incident angle of light and therefore, angles of light incident on the bandpass filter 81 may be preferably as close as possible, so that the bandpass filter 81 serves as a high quality bandpass. Hence, when the bandpass filter 81 is disposed in the detection optical system 80, if the bandpass filter 81 is at the above-described position, a chief ray of the detection light is substantially telecentric and therefore, angles of a light ray group passing through the bandpass filter 81 most are the same. For this reason, an optimum placement position is neither a position between the lenses of the relay optical system nor a position immediately before the image pickup device 22, but is a position before entrance of the detection light into the relay optical system. The chief my is substantially telecentric also in an optical path between the last lens (the second relay lens group 51B) and the image pickup device 22. However, since the reduction optical system is used, Fno becomes brighter according to a reduction magnification, due to the Lagrange invariant relationship. For this reason, concerning light rays except the chief ray, an angle of incident on the bandpass filter 81 increases, which is not desirable.

(Optimization of Passband Width of Bandpass Filter 81)

Although the S/N ratio is drastically improved by inserting the bandpass filter 81, a disadvantage of making the detection difficult is present when the wavelength of signal light deviates from the band allowed to pass therethrough. Next, an optimum value of the passband width will be described as a solution thereto. When a laser light source is used as the detection light-source section, variability of a laser wavelength due to a temperature change depends on a wavelength (a semiconductor material). This may be, for example, 0.27 nm/deg C., in a near-infrared light laser of 783 nm. Assuming that an operating temperature limit of the projection display is 0 deg C. to 40 deg C., if a center is a normal temperature of 25 deg C., a low temperature (0 deg C.): 778 nm (785-0.27*(25-0)), a normal temperature (25 deg C.): 785 nm, and a high temperature (40 deg C.): 789 nm (785+0.27*(40-25)).

In other words, an emission wavelength of the detection light-source section is 778 nm to 789 nm. In this case, at least 11 nm is necessary as the passband width of the bandpass filter 81. The necessary bandwidth may vary depending on a corresponding temperature region, a corresponding wavelength in use, or differences between the individual laser light sources. However, in order to respond to a temperature change in practical use, at least about 10 nm is necessary as the passband width of the bandpass filter 81. In other words, the bandpass filter 81 may preferably have a center wavelength same as a predetermined emission wavelength of the detection light-source section, and may preferably have the passband width of 10 nm or more.

(Suppression of Wavelength Variation)

Figure 26:
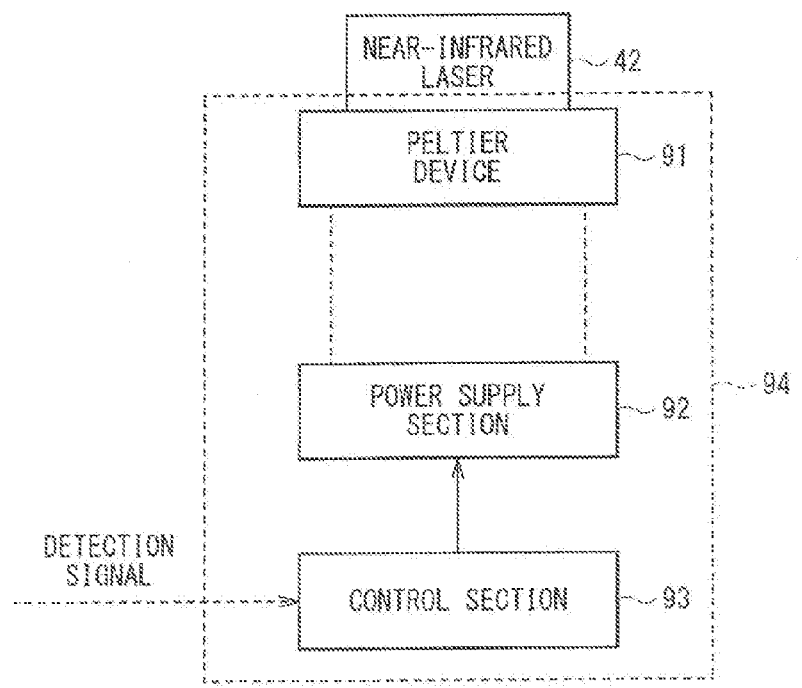
FIG. 26 is a block diagram illustrating a configuration example of a suppression section that controls variations in emission wavelength of a detection light-source section.

Next, a way of addressing the above-described disadvantage due to the variation is wavelength by using another technique will be described. As described above, the emission wavelength of the detection light-source section sensitively varies with temperature. As illustrated in FIG. 26, a suppression section 94 may be provided to suppress this.

The suppression section 94 includes a Peltier device 91 attached to the near-infrared laser 42, a power supply section 92 connected to the Peltier device 91, and a control section 93 controlling the temperature of the Peltier device 91 through the power supply section 92. As illustrated in FIG. 20, the Peltier device 91 is attached in proximity to the near-infrared laser 42 that emits the detection near-infrared light, to prevent the emission wavelength of the near-infrared laser 42 from deteriorating due to an external temperature change. The Peltier device 91A may be controlled by a method of managing the temperature. However, the control section 93 may be preferably used to monitor the detection signal from the image pickup device 22, and to drive the Peltier device 91 so that, for example, a level of the detection signal becomes highest. This makes it possible to achieve optimization in consideration of an individual difference that the near-infrared laser 42 originally has, unevenness of a maximum passing wave of the bandpass filter 81, and the like.

(Optimization of Placement Position of Visible-Light Cut Filter 28)

Concerning the placement position of the bandpass filter 81, it has been described that the optimum placement position of the bandpass filter 81 may be preferably between the polarization beam splitter 23 and the first relay lens group 51A. However, as an adverse effect thereof, this may involve a decrease in contrast of image display for use as projector. As described above in the second embodiment, the visible-light cut filter 28 may be preferably disposed in the detection optical system 80, to reduce the visible light reaching the image pickup device 22. If prevention of the visible light is the only purpose, the visible-light cut filter 28 may be disposed immediately before the image pickup device 22. However, there is a better position for the visible-light cut filter 28.

Figure 27:
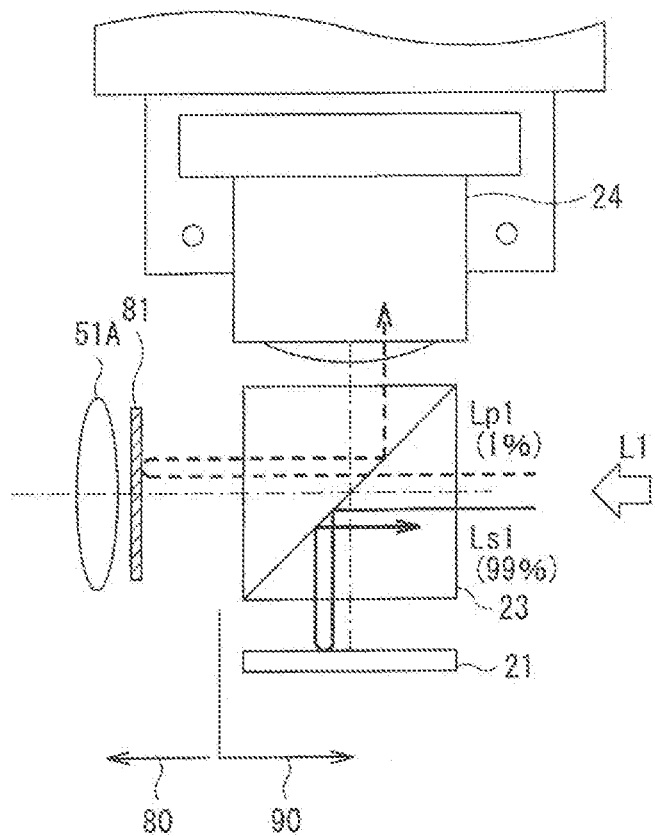
FIG. 27 is a first explanatory diagram for a placement position of a visible-light cut filter.
Figure 28:
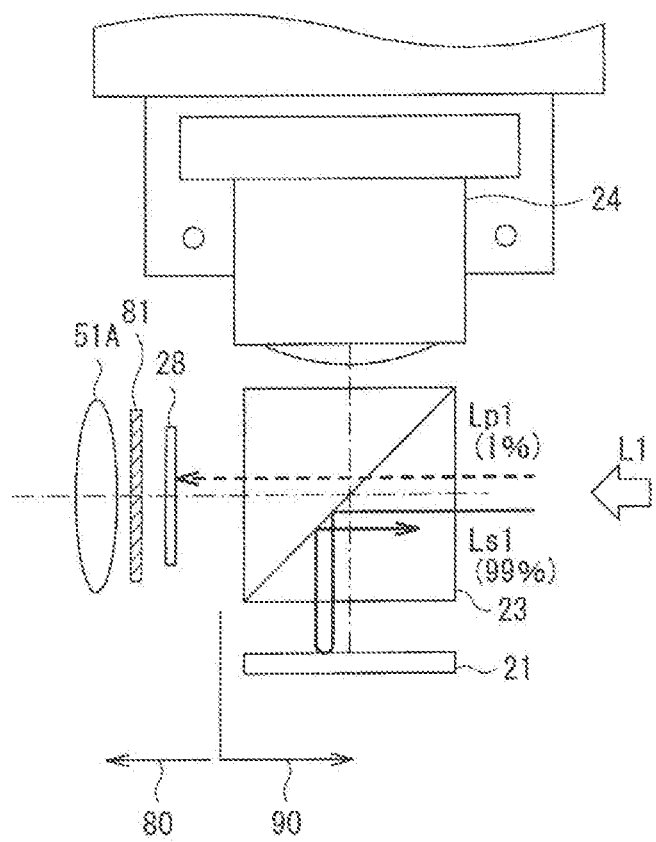
FIG. 28 is a second explanatory diagram for the placement position of the visible-light cut filter.

The bandpass filter 81 is a dielectric multilayer film and therefore reflects bands other than the passband. Hence, for example, as illustrated in FIG. 27, disposing the bandpass filter 81 in the detection optical system 80 may cause the bandpass filter 81 to play a role of reflecting the P-polarized component Lp1 of the illumination, light L1 having passed through the polarization beam splitter 23. The P-polarized component Lp1 reflected by the bandpass filter 81 becomes light returning to the polarization beam splitter 23, and reflected towards the projection lens 24. As a result, the P-polarized component Lp1 is emitted onto the screen, which decreases the contrast of the image display. Therefore, as illustrated in FIG. 28, the visible-light cut filter 28 of an absorption type may be preferably disposed between the bandpass filter 81 and the polarization beam splitter 23. This makes it possible to suppress the reflection of the P-polarized component Lp1, and thereby to prevent the contrast from decreasing.

It is to be noted that, in FIGS. 27 and 28, as an example, the P-polarized component Lp1 included in the illumination light L1 is 1%, and the S-polarized component Ls1 is 99%, but the proportion of each of these polarized components is not limited to this example.

4.3 Other Preferable Configuration Examples

Optimization of Infrared Transmittance of Projection Lens 24

It is possible to improve the S/N ratio, by raising the level of the detection signal by increasing infrared transmittance of the optical components through which the detection light passes. In the projection display of the present embodiment, the detected near-infrared light is incident on the detection optical system 80 through the projection lens 24. An ordinary optical component takes care of only a visible range (mainly RGB) and therefore, transmittance in a visible range is kept high, which is about 90%. However, in the projection lens 24 of an ordinary type, an infrared region is not usually used and therefore is not taken care of. For example, in a case in which the projection lens 24 includes fifteen lens groups like a super short focus lens, when the transmittance of the infrared region is 90% per group, the transmittance of the infrared region for the entire projection lens 24 is $0.9^{15}$=21%. On the other hand, by taking care of the infrared region as well, and increasing the transmittance of the infrared region per group to 97%, the transmittance of the infrared region for the entire projection leas 24 becomes $0.97^{15}$=63% and therefore, the transmittance for the entire projection leas 24 is increased by three times. This allows the level of the detection signal to be purely three-fold higher. Therefore, when a lens of a super short focus type in which the number of lenses tends to be large is used for the projection lens 24, it is very important to take care of, in particular, the transmittance of the infrared region of the lens.

Based upon the foregoing, when the projection lens 24 is configured of N lenses (where N is an integer), the transmittance of the projection lens 24 for the near-infrared light emitted from the detection light-source section may be preferably $(0.95)^N$ or more. The transmittance of the projection lens 24 may be more preferably $(0.97)^N$ or more.

(Optimization of Film Properties of Polarization Beam Splitter 23)

Figure 29:
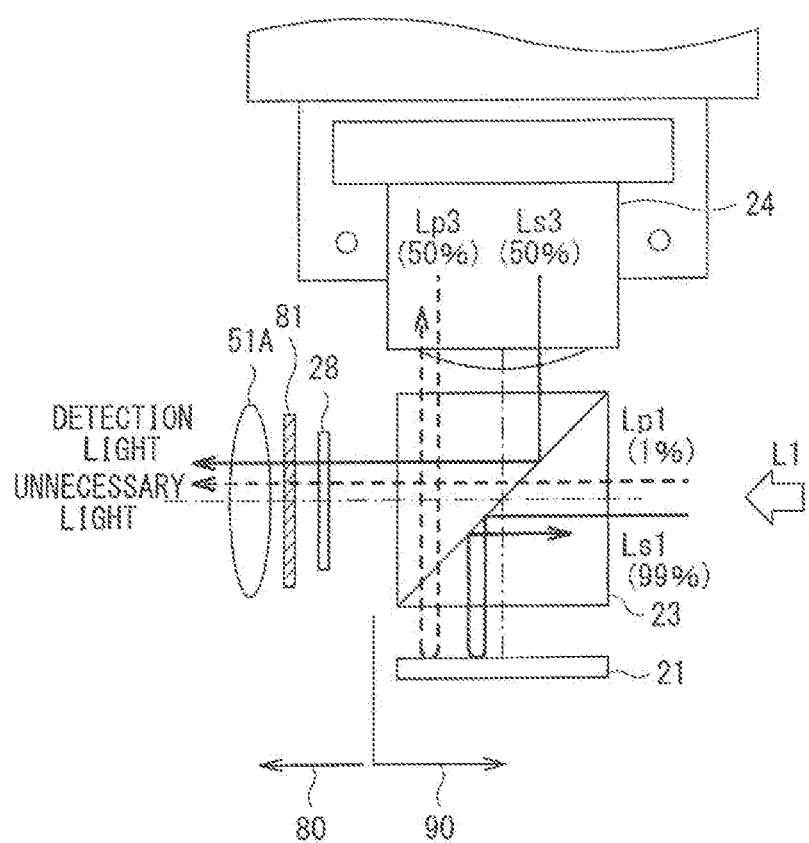
FIG. 29 is a first explanatory diagram for characteristics of a polarization beam splitter.

As illustrated in FIG. 29, usually, in order to improve contrast characteristics of the visible range, the polarization beam splitter 23 may enhance performance of the projector, by being provided with, for example, film properties of reflecting the S-polarized component and allowing the P polarized light to pass therethrough. In other words, there are provided such properties that, for the illumination light L1, the S-polarized component Ls1 is reflected and the P-polarized component Lp1 is allowed to pass therethrough. However, directly applying these properties to the infrared region used for the light detection may not be preferable. In other words, providing properties of reflecting the S-polarized component Ls3 and allowing the P-polarized component Lp3 to pass therethrough for the detection light likewise may not be preferable. In the first place, the detection light returning to the polarization beam splitter 23 upon hitting an object such as a finger is random polarized light scattered by hitting an object like a finger. For this reason, when the polarization beam splitter 23 is allowed to have properties of allowing the P-polarized-light to pass therethrough, only a half or less of the light incident on the polarization beam splitter 23 as the detection light is allowed to be incident on the detection optical system 80. In addition, the infrared light having the P-polarized component included in the illumination light L1 travels into the detection optical system 80 by passing through the polarization beam splitter 23.

Figure 30:
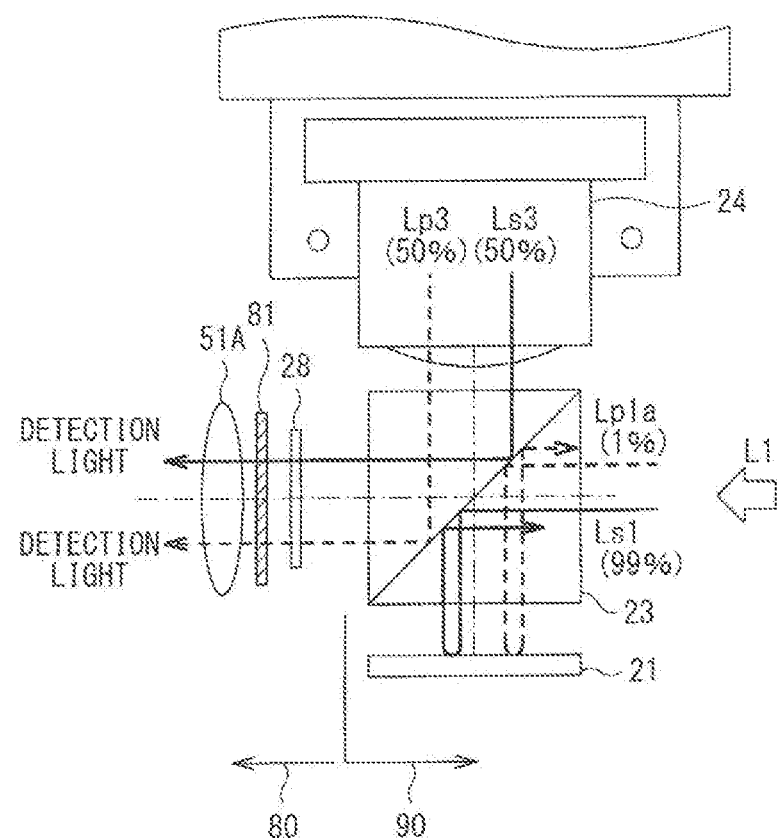
FIG. 30 is a second explanatory diagram for the characteristics of the polarization beam splitter.

Therefore, the polarization beam splitter 23 may preferably have film properties of reflecting the S-polarized component and allowing the P-polarized component to pass therethrough for the visible light, and film properties of reflecting both the S-polarized component and the P-polarized component for the infrared light. This allows, for the detection light, the S-polarized component Ls3 and the P-polarized component Lp3 to be reflected by the polarization beam splitter 23 towards the detection optical system 80, as illustrated in FIG. 30. Therefore, it is possible to double the proportion of the detection light to be incident on the detection optical system 80. In addition, a P-polarized component Lp1a in the infrared region included in the illumination light L1 is reflected and prevented from traveling to the detection optical system 80. This reduces a noise component, and serves as measures for an improvement of the S/N ratio.

It is to be noted that, in FIGS. 29 and 30, the P-polarized component Lp1 included in the illumination light L1 is 1%, and the S-polarized component Ls1 is 99%, but the proportion of each of these polarized components is not limited thereto.

Other Embodiments

Technology of the present disclosure is not limited to the description of each of the above-described embodiments, and may be variously modified.

It is possible to achieve at least the following configurations from the above-described example embodiments of the disclosure.

(1) A projection display including:

a polarized-light separation device configured to separate incident light into a first polarized component and a second polarized component, and to allow the first and the second polarized components to travel in respective directions different from each other;

an illumination section configured to emit illumination light towards the polarized-light separation device, the illumination light including the first and the second polarized components, and the first polarized component being a dominant;

a light valve configured to modulate, based on image data, the first polarized component included in the illumination light entering through the polarized-light separation device, and to allow the modulated light to exit therefrom and to pass through the polarized-light separation device;

a projection lens configured to project, on a projection plane, the modulated light entering from the light valve through the polarized-light separation device, and to receive detection light entering from a direction opposite to a traveling direction of the modulated light;

an image pickup device disposed at a position optically conjugated with the light valve, and configured to receive the detection light having entered through both the projection lens and the polarized-light separation device; and one or more optical members disposed between the illumination section and the image pickup device, and configured to reduce at least the second polarized component included in the illumination light entering the image pickup device.

(2) The projection display according to (1), further including an image processing section configured to detect, based on a result of image-pickup performed by the image pickup device, a position of a feature point of an object on or in proximity to the projection plane, in a fashion of associating the position with coordinates of a projected image on the projection plane.

(3) The projection display according to (1) or (2), wherein the image pickup device picks up an image in a projection area on the projection plane, the projection area being formed by the projection lens and being defined as an image-pickup area.

(4) The projection display according to any one of (1) to (3), wherein the one or more optical members includes a polarizing member disposed between the illumination section and the polarized-light separation device or between the image pickup device and the polarized-light separation device, and configured to remove the second polarized component.

(5) The projection display according to any one of (1) to (3), wherein the one or more optical members includes a visible-light eat filter disposed between the polarized-light separation device and the image pickup device, and configured to reduce a visible light component.

(6) The projection display according to any one of (1) to (5), further including an illumination control section, wherein the illumination section includes a first light source, a second light source, and a third light source, the first light source being configured to emit light of a first wavelength, the second light source being configured to emit light of a second wavelength, and the third light source being configured to emit light of a third wavelength, the illumination control section is configured to control light emission of each of the first to the third light sources in a field sequential scheme, the illumination control section controls light emission to allow a first light emission period and a second light emission period to be provided, the first light emission period being a period in which the first to the third light sources are allowed to emit light with illumination necessary for image projection, and the second light emission period being a period in which the first to the third light sources are allowed to emit light with illumination lower than the illumination in the first light emission period in a range excluding zero illumination, and the image pickup device picks up an image in the second light emission period.

(7) The projection display according to any one of (1) to (3), further including a detection light-source section configured to emit non-visible light for detection, the non-visible light being emitted at least to cover a non-visible light detection field, and the non-visible light detection field being away from the projection plane by a predetermined height and defined by an projection area on the projection plane formed by the projection lens, wherein the non-visible light scattered from an object in proximity to the projection area enters, as the detection light, the image pickup device through both the projection lens and the polarized-light separation device.

(8) The projection display according to (7), wherein the one or more optical members includes a visible-light cut filter disposed between the polarized-light separation device and the image pickup device, and configured to reduce a visible light component.

(9) The projection display according to (8), wherein the one or more optical members includes a polarizing member disposed between the illumination section and the polarized-light separation device or between the image pickup device and the polarized-light separation device, and configured to remove the second polarized component.

(10) The projection display according to any one of (7) to (9), further including an outer easing having a predetermined surface, and incorporating the detection light-source section, wherein the projection lens is a super short focus lens with a throw ratio of 0.38 or less, and the outer casing is disposed to allow the predetermined surface to be coplanar with the projection plane.

(11) The projection display according to any one of (7) to (10), wherein the one or more optical members includes one or more reflecting mirrors disposed between the image pickup device and the polarized-light separation device, and each having polarization-selectivity and wavelength-selectivity, and the one or more reflecting mirrors reflects, towards the image pickup device, the detection light entering through the projection lens and the polarized-light separation device.

(12) The projection display according to any one of (1) to (11), further including one or more relay lens groups disposed between the image pickup device and the polarized-light separation device, and each having positive power.

(13) The projection display according to (12), wherein the relay lens groups include a first relay lens group and a second relay lens group in order from a side close to the polarized-light separation device, and a local length fi of the second relay lens group is smaller than a focal length fb of the first relay lens group.

(14) The projection display according to (13), wherein the first relay lens group and the second relay lens group form a reduction optical system having a reduction magnification B that satisfies $B=fi/fb$, and the following is satisfied:

$Li>B*Lb$ where Li is an effective area of an image pickup surface of the image pickup device, and Lb is an effective area of a display surface of the light valve.

(15) The projection display according to (7), wherein the one or more optical members includes a bandpass filter disposed between the polarized-light separation device and the image pickup device, and configured to allow only light in a specific wavelength region to pass therethrough.

(16) The projection display according to (15), wherein the bandpass filter has a center wavelength same as a predetermined emission wavelength of the detection light-source section, and has a passband width of 10 nm or more.

(17) The projection display according to (15) or (16), further including a suppression section configured to suppress a variation in the emission wavelength of the detection light-source section, not to exceed a passband width of the bandpass filter.

(18) The projection display according to any one of (15) to (17), further including a telecentric optical system disposed between the image pickup device and the polarized-light separation device, wherein the bandpass filter is disposed in an optical path between the telecentric optical system and the polarized-light separation device, the optical path having substantial telecentricity,

(19) The projection display according to any one of (15) to (18), wherein the one or more optical members includes a visible-light cut filter disposed between the bandpass filter and the polarized-light separation device, and having an absorption property.

(20) The projection display according to any one of (15) to (19), further including an infrared cut filter disposed between the illumination section and the polarized-light separation device, wherein the detection light-source section emits infrared light as the non-visible light, and the infrared cut filter is configured to reduce the infrared light while allowing visible light to pass therethrough.

(21) The projection display according to any one of (15) to (20), wherein the detection light-source section emits infrared light as the non-visible light, the projection lens includes N lenses where N is an integer, and transmittance of the projection lens for the infrared light emitted from the detection light-source section is $(0.95)^N$ or more.

(22) The projection display according to any one of (15) to (21), wherein the detection light-source section emits infrared light as the non-visible light, and the polarized-light separation device has properties of reflecting the first polarized component and allowing the second polarized component to pass therethrough for visible light, as well as properties of reflecting both the first and the second polarized components for the infrared light.

(23) The projection display according to any one of (1) to (22), wherein the polarized-light separation device allows the first polarized component included in light from a first direction to travel in a second direction, and allows the second polarized component included in the light entering from the first direction to travel in a third direction, the illumination section emits the illumination light from the first direction, towards the polarized-light separation device, the light valve modulates, based on image data, the first polarized component included in the illumination light entering from the second direction tough the polarized-light separation device, and allows the modulated light to exit therefrom in a fourth direction and to pass through the polarized-light separation device, the projection lens projects, on the projection plane, the modulated light entering from the light valve from the fourth direction, the image pickup device receives the detection light from the third direction through both the projection lens and the polarized-light separation device, and the one or more optical members reduces at least the second polarized component included in the illumination light.

Furthermore, the technology encompasses any possible combination of some or all of the various embodiments described herein and incorporated herein.

(1) An optical module comprising:

a polarized-light separation device-configured to separate first and second polarized components of incident light;

a light valve configured to receive at least the first polarized component, and output at least a portion of the received light to the polarized-light separation device;

an imaging device disposed at a position that is at least substantially optically conjugated with the light valve; and an optical member positioned and configured to remove at least a portion of the second polarized component of the incident light before reaching the image pickup device.

(2) The optical module according to (1), wherein the light valve is configured to modulate at least the first polarized component, and output at least a portion of the modulated light to the polarized-light separation device.

(3) The optical module according to (1), wherein the polarized-light separation device is a wire grid.

(4) The optical module according to (1), wherein the optical member is a polarizer that removes an s-polarized component as the second polarized component.

(5) The optical module according to (1), wherein the optical member is disposed between the image device and the polarized-light separation device.

(6) The optical module according to (1), wherein the optical member and the image device are disposed in a first incident light direction.

(7) The optical module according to (6), wherein the light valve is disposed in a second direction that intersects with the first incident light direction.

(8) The optical module according to (1), wherein the polarized-light separation device is a polarization beam splitter, and the optical member is a polarizer that removes a polarized component as the second polarized component.

(9) The optical module according to (1), wherein the polarized-light separation device is disposed between the image device and the optical member.

(10) The optical module according to (9), wherein the polarized-light separation device is a polarization beam splitter, and the optical member is a polarizer that removes a polarized component as the second polarized component.

(11) The optical module according to (1), further comprising a visible-light filter disposed adjacent to the image device.

(12) The optical module according to (1), wherein the polarized-light separation device is disposed between the visible-light filter and the optical member.

(13) The optical module according to (1), wherein the optical member includes a plurality of reflecting mirrors each having polarization-selectivity and wavelength-selectivity.

(14) The optical module according to (13), wherein the reflecting mirrors are positioned between a first relay lens group and a second relay lens group.

(15) The optical module according to (1), wherein the optical member includes at least one of a band-pass filter and a polarizer.

(16) An optical system comprising:

an optical module including a polarized-light separation device configured to separate first and second polarized components of incident light;

a light valve coo figured to receive at least the first polarized component, and output at least a portion of the received light to the polarized-light separation device;

an imaging device disposed at a position that is at least substantially optically conjugated with the light valve;

an optical member positioned and configured to remove at least a portion of the second polarized component of the incident light before reaching the image pickup device; and an image processing section configured to process image data received by the image pickup device.

(17) The optical system according to (16), wherein the light valve is configured to modulate at least the first polarized component, and output at least a portion of the modulated light to the polarized-light separation device.

(18) The optical system according to (16), wherein the image processing section is configured to process image data based on received light that is outside the visible light spectrum.

(19) The optical system according to (16), further comprising a visible-light filter disposed adjacent to the image device.

(20) A detection method comprising:

separating first and second polarized components of incident light with a polarized-light separation device;

receiving with a light valve at least the first polarized component, and outputting at least a portion of the received light to the polarized-light separation device;

projecting an image, based on at least a portion of the modulated light, in a projection path toward a projection area;

receiving with an imaging device at least portions of detection light that is incident from the projection area alter the detection light interacts with the polarized-light separation device; and detecting, based on image processing by the image device, a position of the object that is positioned in the projection path, wherein at least a portion of the second polarized component of the incident light is removed by an optical member before reaching the image pickup device.

(21) The method according to (20), further comprising modulating at least the first polarized component, and outputting at least a portion of the modulated light to the polarized-light separation device.

(22) The method according to (20), wherein projecting the image and detecting the position of the object occur simultaneously.

(23) The method according to (20), wherein detecting the position of the object is based on light detected by the image device that is outside the visible light spectrum.

(24) An optical module comprising:
a polarized-light separation device configured to separate first and second polarized components of incident light;
a light valve configured to receive at least the first polarized component, and output at least a portion of the received light to the polarized-light separation device;
an imaging device disposed at a position that is at least substantially optically conjugated with the light valve; and
an optical member positioned in front of the polarized-light separation device.

It should be understood by those skilled in the art that various modifications, combinations, subcombinations and alterations may occur depending on design requirements and other factors insofar as they are within the scope of the appended claims or the equivalents thereof.

The invention claimed is:

1. An optical module comprising:
a polarized-light separation device configured to separate first and second polarized components of incident light;
a light valve configured to receive at least the first polarized component, ad output at least a portion of the received light to the polarized-light separation device;
an image pickup device disposed at a position that is at least substantially optically conjugated with the light valve;
an optical member positioned and configured to remove at least a portion of the second polarized component of the incident light before reaching the image pickup device; and
a bandpass filter disposed between the polarized light separation device and the image pickup device, and configured to allow only light in a specific wavelength region to pass therethrough.

2. The optical module according to claim 1, wherein the light valve is configured to modulate a least the first polarized component, and output at least a portion it the modulated light to the polarized-light separation device.

3. The optical module according to claim 1, wherein the polarized-light separation device is a wire grid.

4. The optical module according to claim 1, wherein the optical member is a polarized that removes a polarized component as the second polarized component.

5. The optical module according to claim 4, wherein the polarized-light separation device is a polarization beam splitter.

6. The optical module according to claim 1, wherein the optical member is disposed between the image pickup device and the polarized-light separation device.

7. The optical module according to claim 1, wherein the optical member and the image pickup device are disposed in a first incident light direction.

8. The optical module according to claim 7, wherein the light valve is disposed in a second direction that intersects with the first incident light direction.

9. The optical module according to claim 1, wherein the polarized-light separation device is disposed between the image pickup device and the optical member.

10. The optical module according to claim 1, further comprising a visible-light filter disposed adjacent to the image pickup device.

11. The optical module according to claim 10, wherein the polarized-light separation device is disposed between the visible-light filter and the optical member.

12. The optical module according to claim 1, wherein the optical member includes a plurality of reflecting mirrors each having polarized-selectivity and wavelength-selectivity.

13. The optical module according to claim 12, wherein the plurality of reflecting mirrors are positioned between a first relay lens group and a second relay lens group.

14. The optical module according to claim 1, wherein the optical member includes a polarized.

15. An optical system comprising:
an optical module including
a polarized-light separation device configured to separate first and second polarized components of incident light;
a light valve configured to receive at least the first polarized component, and output at least a portion of the received light to the polarized-light separation device;
an image pickup device disposed at a position that is at least substantially optically conjugated with the it valve;
an optical member positioned and configured to remove at least a portion of the second polarized component of the incident light before reaching the image pickup device;
a bandpass filter disposed between the polarized-light separation device and the image pickup device, and configured to allow only light in a specific wavelength region to pass therethrough; and
an image processing section configured to process image data received by the image pickup device.

16. The optical system according to claim 15, wherein the light valve is configured to modulate at least the first polarized component, and output at least a portion of the modulated light to the polarized-light separation device.

17. The optical system according to claim 15, wherein the image processing section is configured to process the image data based on received light that is outside a visible light spectrum.

18. The optical system according to claim 15, further comprising a visible-light filter disposed adjacent to the image pickup device.

19. A detection method comprising:
separating first and second polarized components of incident light with a polarizing-light separation device;

receiving with a light valve at least the first polarized component, and outputting at least a portion of the received light to the polarized-light separation device;

projecting an image, based on at least a portion of the received light, in a projection path toward a projection area;

allowing, with a bandpass filter disposed between the polarized-light separation device and an image pickup device, only light in a specific wavelength region to pass through the bandpass filter before reaching the image pickup device;

receiving with the image pickup device at least portions of detection light that is incident from the projection area after the detection light interacts with the polarized-light separation device; and detecting, based an image processing by the image pickup device, a position of an object that is positioned in the projection path, wherein at least a portion of the second polarized component of the incident light is removed by an optical member before reaching the image pickup device.

20. The method according to claim 19, further comprising modulating at least the first polarized component, and outputting at least a portion of the modulated light to the polarized-light separation device.

21. The method according to claim 19, wherein projecting the image and detecting the position of the object occur simultaneously.

22. The method according to claim 19, wherein detecting the position of the object is based on light detected by the image pickup device that is outside a visible light spectrum.

23. An optical module comprising:
  a polarized-light separation device configured to separate first and second polarized components of incident light;
  a light valve configured to receive at least the first polarized component, and output at least a portion of the received light to the polarized-light separation device;
  an image pickup device disposed at a position that is at least substantially optically conjugated with the light valve;
  an optical member positioned in front of the polarized-light separation device; and
  a bandpass filter disposed between the polarized-light separation device and the image pickup device, and configured to allow only light in a specific wavelength region to pass therethrough.

* * * * *